US 6,731,580 B1

(12) United States Patent
Sato et al.

(10) Patent No.: US 6,731,580 B1
(45) Date of Patent: May 4, 2004

(54) DISK UNIT WITH DUAL RELEASE MECHANISM FOR RELEASING COVER RETAINING MEMBER

(75) Inventors: Taku Sato, Kodaira (JP); Hiroyuki Sato, Hamura (JP)

(73) Assignee: TEAC Corporation, Tokyo (JP)

( * ) Notice: Subject to any disclaimer, the term of this patent is extended or adjusted under 35 U.S.C. 154(b) by 403 days.

(21) Appl. No.: 09/666,396

(22) Filed: Sep. 20, 2000

(30) Foreign Application Priority Data

Oct. 29, 1999 (JP) .......................................... 11-310192

(51) Int. Cl.[7] .............................................. G11B 5/00
(52) U.S. Cl. ..................................................... 369/75.1
(58) Field of Search ........................ 369/75.1, 79, 200; 360/97.01, 99.08, 99.09, 99.02, 99.03, 99.06, 99.07, 96.6, 137; 361/685; 396/418

(56) References Cited

U.S. PATENT DOCUMENTS

| | | | | |
|---|---|---|---|---|
| 4,447,900 A | * | 5/1984 | Schatteman et al. | ........ 369/200 |
| 5,249,091 A | * | 9/1993 | Shimizu et al. | .......... 360/99.06 |
| 5,359,478 A | * | 10/1994 | Kawano | .................... 360/96.6 |
| 6,191,922 B1 | * | 2/2001 | Shimada et al. | ............ 360/137 |
| 6,375,367 B2 | * | 4/2002 | Taku | .......................... 396/418 |

FOREIGN PATENT DOCUMENTS

| JP | 6-243670 | 2/1994 |
|---|---|---|
| JP | 10092074 | 10/1998 |
| JP | 11027024 A | * 1/1999 |

OTHER PUBLICATIONS

Office Action of Korean Patent Office in Korean for Korean Patent Application No. 10–200–0060681, with English translation, citing two references.
Japanese Laid–Open Patent Publication No. 1–151049 with English Abstract.
Korean Laid–Open Patent Application No. 1995—9630, the content of which is summarized in the English translation of the office action of the Korean Patent Office.

* cited by examiner

Primary Examiner—Tianjie Chen
(74) Attorney, Agent, or Firm—Anderson Kill & Olick; Eugene Lieberman; Michael N. Meller

(57) ABSTRACT

A disk unit includes a loading portion that accommodates a recording medium, a main body unit that contains the loading portion, a cover rotatably attached to the main body unit and capable of moving between a closed position that covers the loading portion and a plurality of open positions that exposes the loading portion, a retaining member provided on the main body unit for retaining the cover in the closed position, a member for manually moving the retaining member to a release position at which the cover is released from retention in the closed position, a drive member activated in response to an eject signal, and a drive transmission mechanism that transmits a drive force of the drive member to the retaining member so as to move the retaining member to the release position.

15 Claims, 17 Drawing Sheets

DISK UNIT WITH DUAL RELEASE MECHANISM FOR RELEASING COVER RETAINING MEMBER

BACKGROUND OF THE INVENTION

1. Field of the Invention

The present invention relates generally to a disk unit, and more particularly, to a disk unit constructed so that a rotating cover can be opened to load or remove a disk-shaped recording medium loaded therein.

2. Description of the Related Art

As one type of conventional disk unit, that which is adapted for use in a CD-ROM device connected to a lap-top personal computer is known. Such an arrangement, in which the CD-ROM device is separate from the personal computer, has the advantage of allowing such computers to be made thinner, lighter and more compact.

This type of CD-ROM device is connected to the lap-top personal computer via a cable and a connector. A compact disk (hereinafter "disk") on which information is recorded is read by an optical pick-up and sent to the computer.

FIGS. 1A and 1B are schematic diagrams showing side views of a conventional disk unit used in such a CD-ROM device, with a cover thereof in a closed state and an open state, respectively.

As shown in FIG. 1A, the CD-ROM device 1 has a tray 2 on which a disk (not shown in the diagram) is loaded and a cover 3 rotatably supported so as to provide access to the tray 2. The cover 3 is opened when removing a disk from or placing a disk on the tray 2 and is retained in a closed position when the disk is loaded.

Reference numeral 4 is an eject switch, slidably disposed on a lateral surface of the tray 2. The eject switch 4 has a hook-like engaging member 4a that retains a retaining member 5 projecting from a lower surface of the cover 3. The eject switch 4 is impelled in a direction A by a spring member not shown in the diagram and thus held at a position at which it engages the retaining member 5.

Accordingly, the cover 3, when in a closed position, is retained by the hook-like engaging member 4a of the eject switch 4 and protects a disk loaded onto a turntable that is not shown in the drawing but which is provided within the tray 2.

As shown in FIG. 1B, the cover 3 is opened by the force of a torsion spring 6 shown by a dotted line in the drawing. Thus, when the eject switch is slid in a B direction so as to release the hook-like engaging member 4a from the retaining member 5 projecting from a lower surface of the cover 3, the force of the torsion spring swings the cover 3 open.

Accordingly, when the eject switch 4 is slid. open, that is, in the B direction that releases the hook-like engaging member 4a from the retaining member 5 projecting from the lower surface of the cover 3, the force of the torsion spring 6 swings the cover 3 open so as to expose the disk loading portion of the device. An operator then removes the disk placed atop the turntable or, alternatively, places a disk on the turntable and then swings the cover to a closed position, thereby engaging the hook-like engaging member 4a with the retaining member 5 projecting from a lower surface of the cover 3.

In a disk unit having a structure like that described above, removing the disk from the device or, alternatively, loading a disk into the device, necessitates manually sliding the eject switch 4 open in order to open the cover 3.

However, such a disk unit structure has a disadvantage in that an operator engaged in operating the personal computer to which the disk unit is connected would be required to search for the eject switch 4. Conventionally, this means that the operator must look away from the display monitor in order to manipulate the disk unit, thus interrupting the use of the computer and creating an inconvenience.

Additionally, with the conventional disk unit having the structure described above, when the eject switch 4 is moved in the direction that opens the cover 3 when removing or loading a disk, the spring force of the torsion spring 6 forces the cover 3 to at once rotate to a fully open position and thus expose the disk loading portion before the disk has stopped rotating, which is undesirable.

Additionally, conventionally when the cover is opened the motor that rotatably drives the turntable is supplied with a counterelectromotive force so as to stop the turntable. However, with disks rotating at high rotational speeds of 30× to 40×, for example, it is difficult to completely halt the rotation of the disk in the short time it takes for the cover 3 to open. As a result, the disk continues to rotate due to inertia even after the cover 3 is opened, which is undesirable.

As a result, the operator must wait for the rotating disk to come to a complete halt before removing the disk, which is inconvenient.

SUMMARY OF THE INVENTION

Accordingly, it is an object of the present invention to provide an improved and useful disk unit in which the above-described disadvantages are eliminated.

The above-described object of the present invention is achieved by a disk unit comprising:

a loading portion that accommodates a recording medium;

a main body unit that contains the loading portion;

a cover rotatably attached to the main body unit and capable of moving between a closed position that covers the loading portion and a plurality of open positions that exposes the loading portion;

a retaining member provided on the main body unit for retaining the cover in the closed position;

means for manually moving the retaining member to a release position at which the cover is released from retention in the closed position;

drive means activated in response to an eject signal; and a drive transmission mechanism that transmits a drive force of the drive means to the retaining member so as to move the retaining member to the release position.

According to this aspect of the invention, the cover retention can be released and the cover opened in response to a signal from an external source such as, for example, a personal computer, thus facilitating removal and loading of a disk to and from the disk unit.

The above-described object of the present invention is also achieved by the disk unit as described above, wherein the retaining member comprises an engaging portion that is accommodated within an aperture in the means for manually moving the retaining member so as to move freely within the aperture when moving toward the release position in response to the eject signal.

According to this aspect of the invention, the retaining member moves to the release position without involving the manual eject means, so a powered eject operation can be performed while at the same time preventing the manual eject means from contacting nearby components.

The above-described object of the present invention is also achieved by the disk unit as described above, wherein the drive transmission mechanism comprises:

a transmission member that moves the retaining member to the release position; and a reset mechanism that resets the transmission member to an original position when the means for manually moving the retaining member to the release position is operated.

According to this aspect of the invention, the transmission member can be manually reset to an original position if power is cut at an intermediate stage of the powered eject operation.

The above-described object of the present invention is also achieved by the disk unit as described above, wherein the reset mechanism comprises:

a reset projection provided on the retaining member that moves toward the release position when the means for manually moving the retaining member to the release position is operated;

a reset lever that separates another transmission member from the transmission member when the reset projection moves toward the release position; and an impelling member that returns the transmission members to original positions when the reset lever separates the transmission members from each other.

According to this aspect of the invention, the drive transmission mechanism can be reset to an original position if power is turned OFF at an intermediate stage of the powered eject operation and the eject operation halted.

The above-described object of the present invention is also achieved by the disk unit as described above, further comprising a drive unit for controlling the drive means in response to an eject signal transmitted from a computer connected to the disk unit via a cable.

According to this aspect of the invention, the cover of the disk unit can be opened automatically in response to an external command.

The above-described object of the present invention is also achieved by the disk unit as described above, wherein the cable transmits control signals for reading information recorded on the recording medium.

According to this aspect of the invention, an eject signal can be transmitted using an ordinary cable, without the need for a separate, dedicated cable to transmit the eject command.

The above-described object of the present invention is also achieved by a disk unit comprising:

a loading portion that accommodates a recording medium;

a main body unit that contains the loading portion;

a cover rotatably attached to the main body unit and capable of moving between a closed position that covers the loading portion and a plurality of open positions that exposes the loading portion;

an impelling member provided between the main body unit and the cover for impelling the cover toward the plurality of open positions;

a retaining member provided on the main body unit for retaining the cover in the closed position; and stopping means for stopping the cover at an intermediate position between the closed position and a fully open position when the retaining member moves to a release position at which the cover is released from retention in the closed position.

According to this aspect of the invention, the rotation of the disk can be stopped while the cover is held at an intermediate open position, after which the disk can be removed or replaced promptly once the cover is fully opened.

The above-described object of the present invention is also achieved by the disk unit as described above, wherein the stopping means comprises:

a cam surface against which the impelling member presses; and a stepped portion formed on the cam surface that contacts the impelling member and restricts a movement of the cover toward the fully open position.

According to this aspect of the invention, the stopping means can be formed relatively inexpensively and without the need to increase the number of component parts.

The above-described object of the present invention is also achieved by the disk unit as described above, wherein the impelling member comprises a roller that contacts either the cam surface or the stepped portion and rotatably drives either the cam surface or the stepped portion in response to an opening or a closing of the cover.

According to this aspect of the invention, use of the roller smoothes the opening and closing of the cover.

The above-described object of the present invention is also achieved by the disk unit as described above, further comprising a braking mechanism linked to the opening and closing of the cover, such that the braking mechanism brakes the recording medium when the cover is opened and releases the recording medium when the cover is closed.

According to this aspect of the invention, the length of time required for the rotation of the disk to stop once the cover has been opened can be reduced.

Other objects, features and advantages of the present invention will become apparent from the following detailed description when read in conjunction with the accompanying drawings.

DESCRIPTION OF THE PREFERRED EMBODIMENTS

A detailed description will now be given of a disk unit according to an embodiment of the present invention, with reference to the accompanying drawings. It should be noted that identical or corresponding elements are given identical or corresponding reference numbers in all drawings, with detailed descriptions thereof given once and thereafter omitted.

Figure 2:
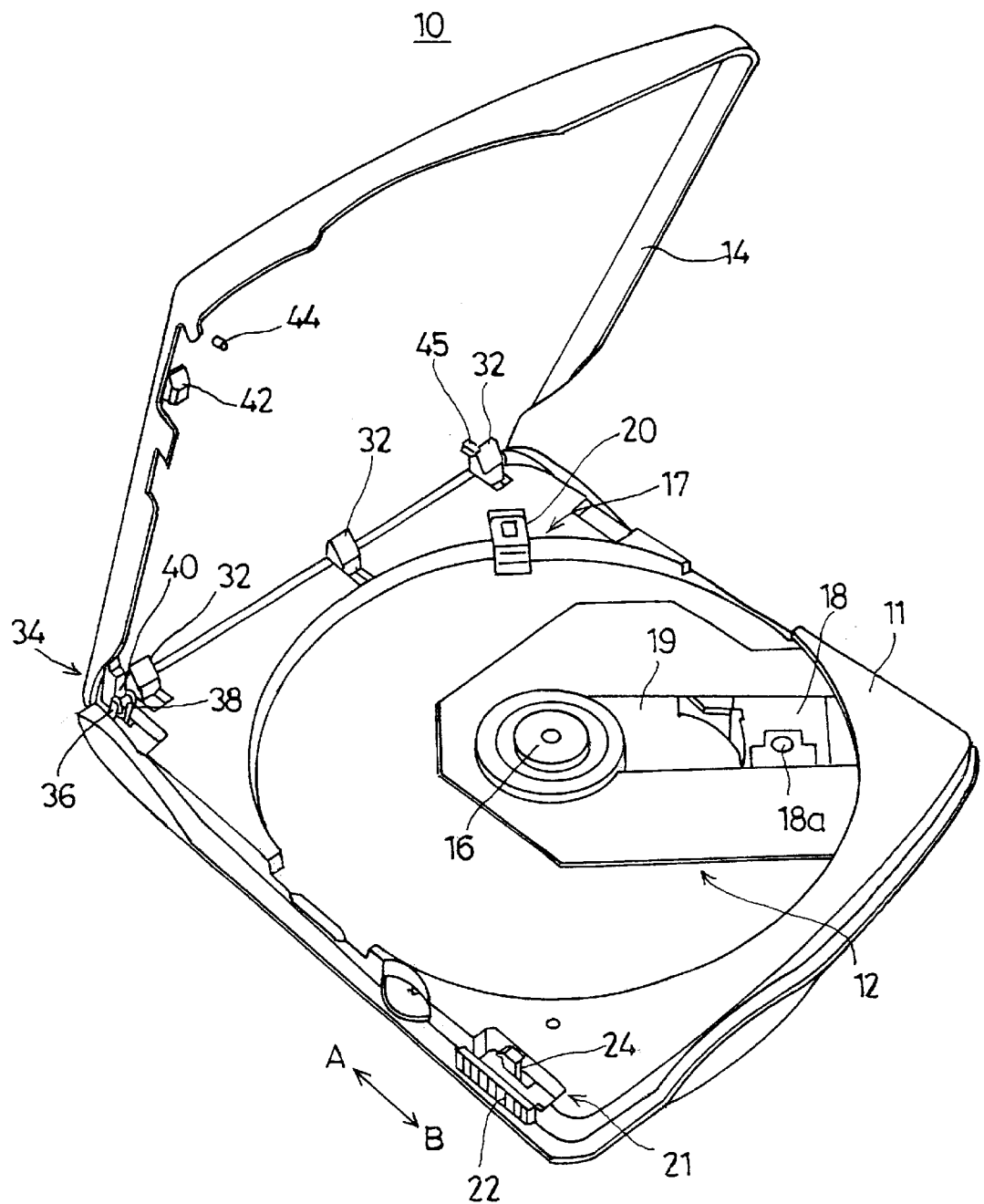
FIG. 2 is a diagram showing a perspective view of a CD-ROM device adapting the disk unit according to one embodiment of the present invention.
Figure 3:
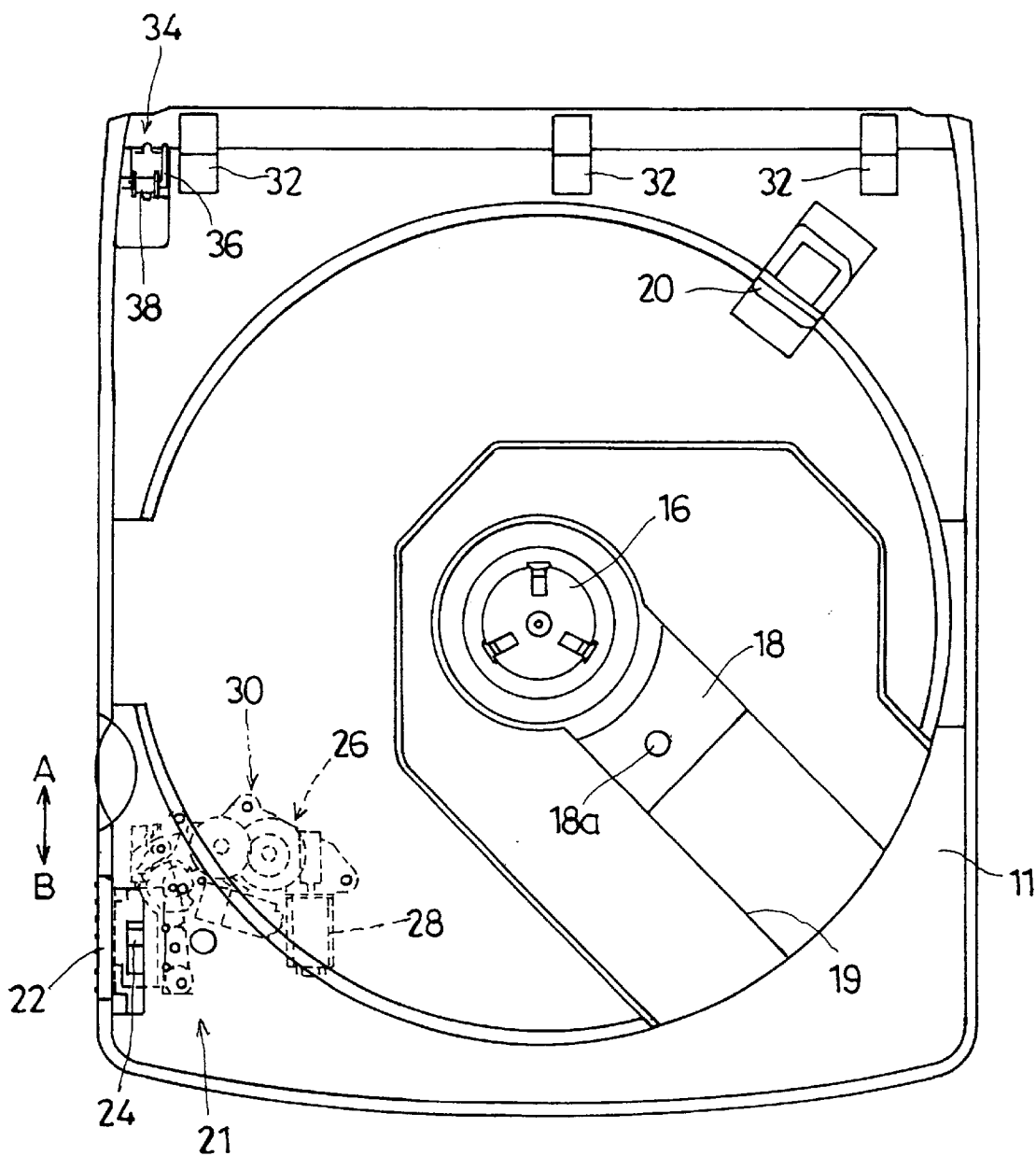
FIG. 3 is a diagram showing a plan view of a CD-ROM device adapting the disk unit of the present invention, in a state in which the cover is removed for descriptive convenience.

FIG. 2 is a diagram showing a perspective view of a CD-ROM device adapting the disk unit according to one embodiment of the present invention. FIG. 3 is a diagram showing a plan view of a CD-ROM device adapting the disk unit of the present invention, in a state in which the cover is removed for descriptive convenience.

As shown in FIGS. 2 and 3, the CD-ROM device 10 is a portable one, connected via a connecting cable to a lap-top personal computer not shown in the diagram. This CD-ROM device 10 has a disk unit that comprises a tray 11 for holding a disk (not shown in the drawing) which is a recording medium, a disk loading portion 12 provided on an upper surface of the tray 11, and a cover 14 that opens and closes the disk loading portion 12.

The disk loading portion 12 has a turntable 16 that rotatably drives a loaded disk set thereupon. It should be noted that in both FIGS. 2 and 3 a spindle motor for rotatably driving the turntable 16 is provided beneath the turntable 16 but is hidden from view by the turntable 16, and hence not shown in the drawing.

An optical pick-up for reading data recorded on the loaded disk is provided on the tray 11. This optical pick-up 18 is moved along an opening 19 formed in a radial direction of the disk by a pick-up drive mechanism (not shown in the drawing) provided on an inside of the tray 11, and projects a laser beam onto a recording surface of the disk via an object lens 18a so as to read the data recorded on the disk by light reflected back from the recording surface.

A disk braking mechanism 17 that brakes the disk when the cover 14 opens is also provided on the tray 11. This disk braking mechanism 17 includes a brake member 20 that halts the rotation of the disk when the cover 14 is open and a brake release pin 45 that moves the brake member 20 to a brake release position. That is, when the cover 14 is closed the brake release pin 45, which is provided on a lower surface of the cover 14, presses the brake member 20 toward an outside of the disk loading portion 12, thereby separating the brake member 20 from the disk loaded on the turntable 6.

The CD-ROM device 10 has an eject mechanism 21 that combines both a manual eject mechanism, which releases the cover 14 retention manually, and a powered eject mechanism, which releases the cover 14 retention by activating a motor with a control signal sent from the personal computer.

The tray 11 is further provided with a manual eject switch 22 capable of sliding in a direction of arrows A–B in the drawing. At a slide position in the direction of arrow A the cover 14 is retained. At a slide position in the direction of arrow B the cover 14 is released. A retaining member 24 that is provided on the upper surface of the tray 11 slides in the direction of arrow B when the eject switch is slid in the direction that releases the cover, that is, in the direction of arrow B.

A retention release drive portion 26 that drives the retaining member 24 in the direction that releases the cover, that is, in the direction of arrow B, is provided on the inside of the tray 11. This retention release drive portion 26 comprises an eject motor 28 as a drive means and a drive transmission mechanism 30 for transmitting the drive force of the motor 28 to the retaining member 24.

Figure 1A:
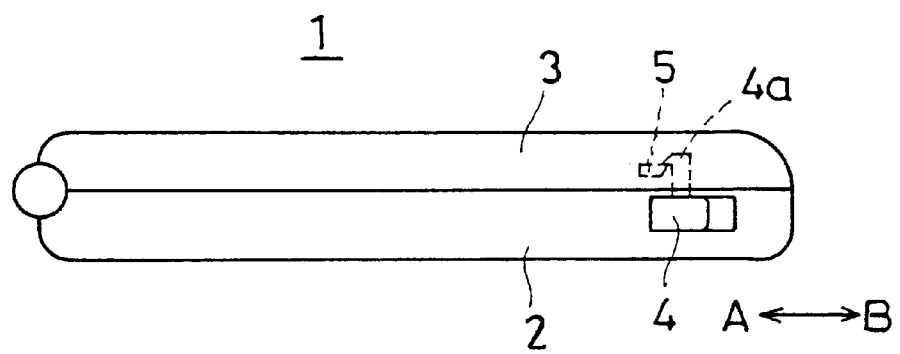
FIGS. 1A and 1B are schematic diagrams showing side views of a conventional disk unit employed in a CD-ROM device, with a cover thereof in a closed state and an open state, respectively.
Figure 1B:
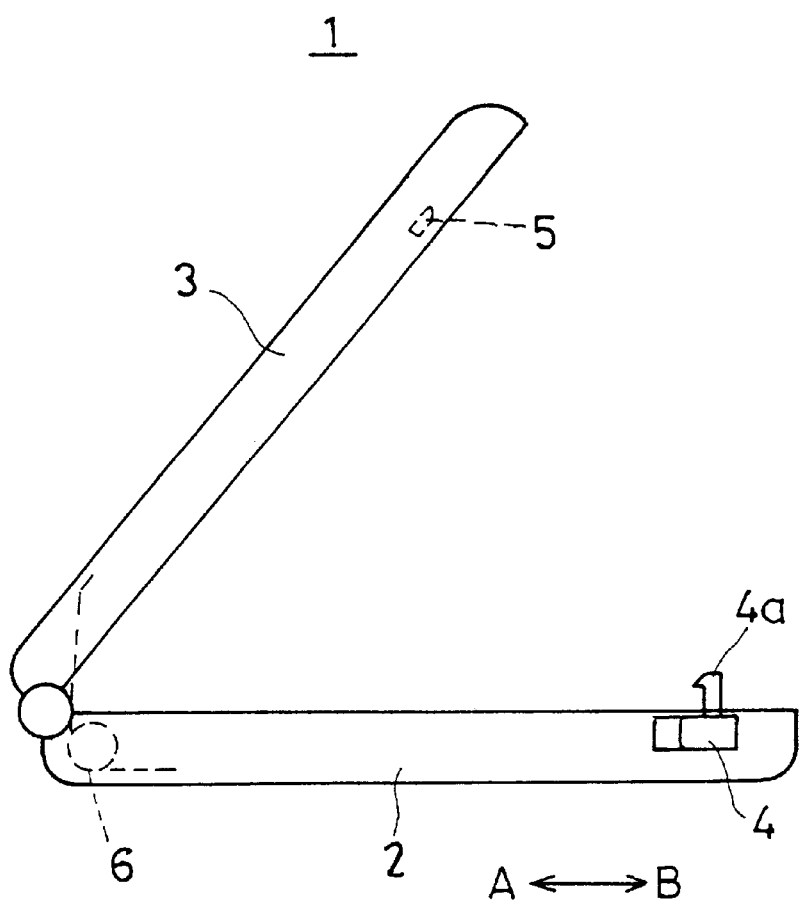

The cover 14 is rotatably supported at a rear portion of the tray 11 by bearing portions 32 provided at three places as shown in FIG. 3, in such a way that the cover 14 is impelled in an open direction by a cover opening mechanism 34. The cover opening mechanism 34, as will be described in more detail later, comprises a roller 38 supported by a torsion spring 36 and a cam portion 40 (see FIG. 1) that contacts the roller 38 and which is provided on the cover 14.

Additionally, as shown in FIG. 2, the lower surface of the cover 14 is provided with a retaining portion 42 that is engaged by the retaining member 24 described above, a detection pin 44 that contacts a microswitch installed in the tray 11 (though not shown in the drawing) and determines that the cover has moved to the closed position, and a brake release pin 45. The retaining portion 42, detection pin 44 and brake release pin 45 project from the lower surface of the cover 14.

Figure 4:
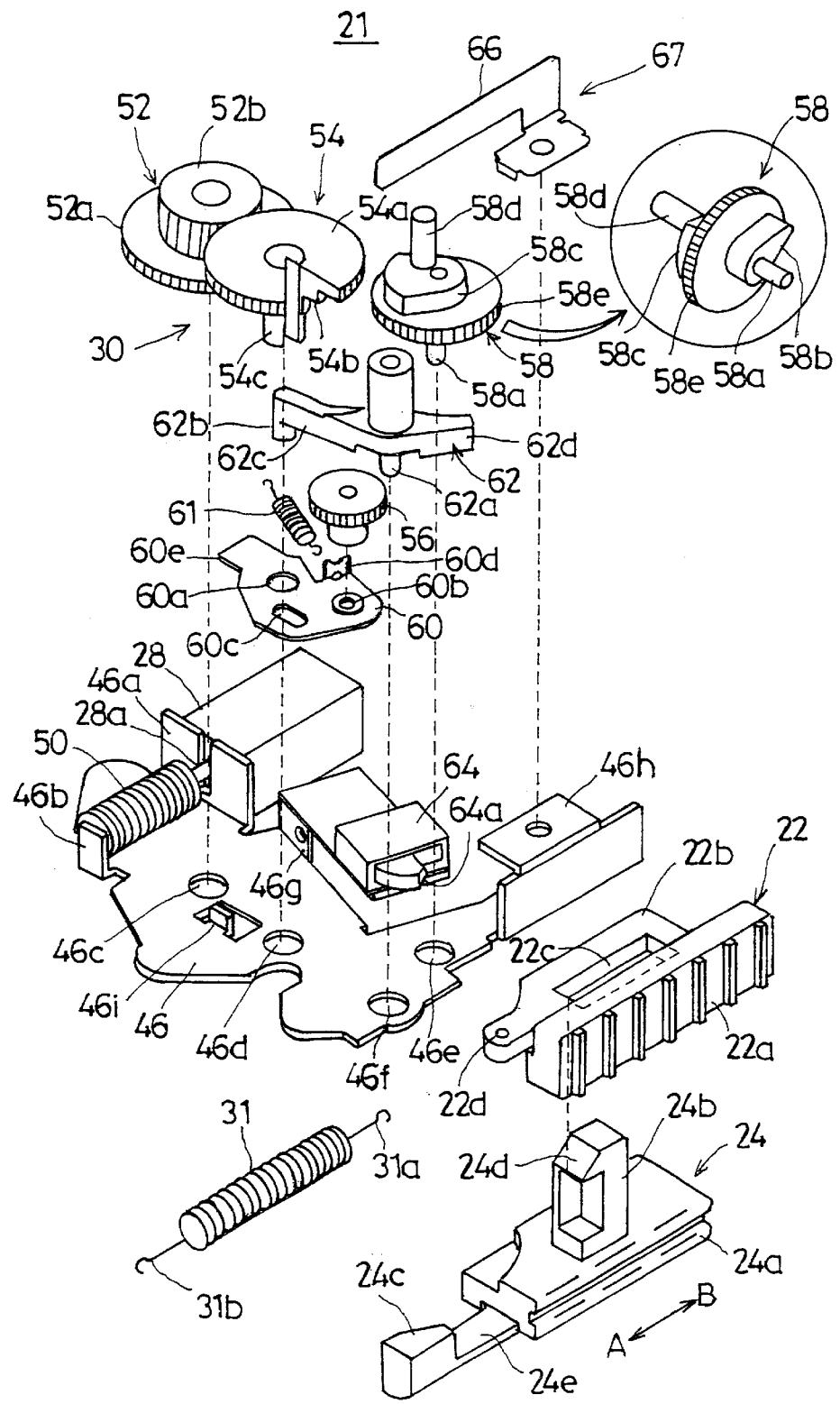
FIG. 4 is a diagram showing an exploded perspective view of the eject mechanism of the present invention in a disassembled state.
Figure 5:
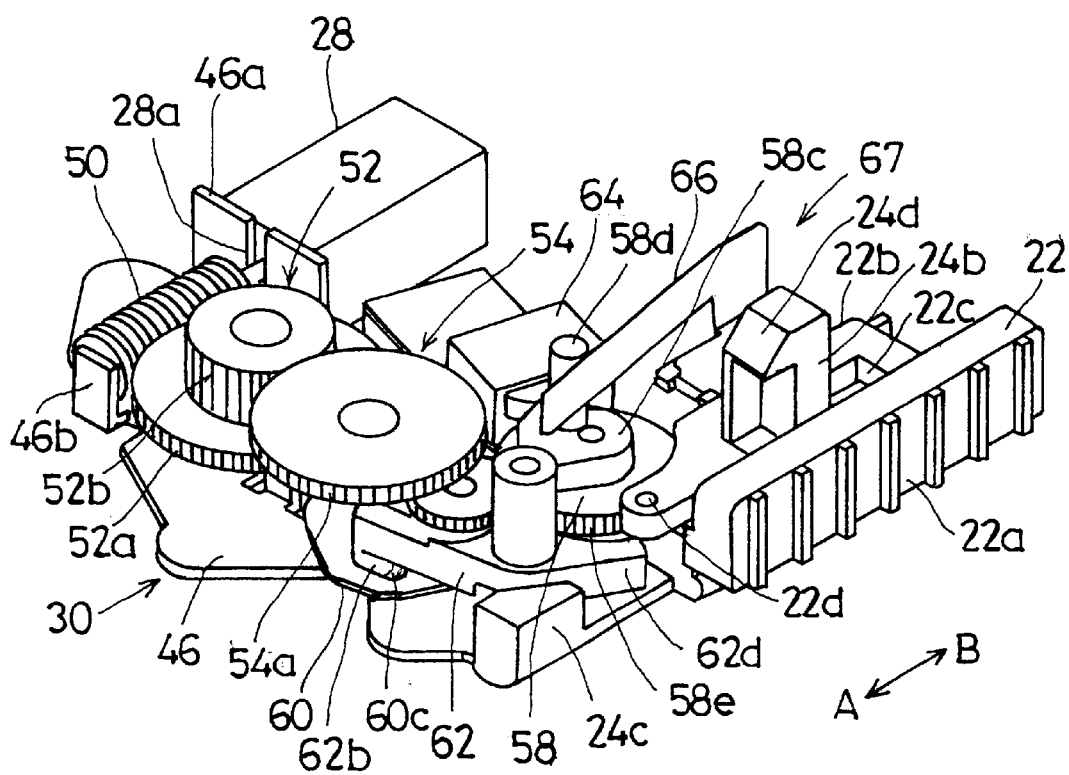
FIG. 5 is a diagram showing a perspective view of the eject mechanism in an assembled state.

FIG. 4 is a diagram showing an exploded perspective view of an eject mechanism of the present invention in a disassembled state. FIG. 5 is a diagram showing a perspective view of the eject mechanism in an assembled state.

As shown in FIGS. 4 and 5, the eject mechanism 21 comprises the manual eject switch 22, the retaining member 24, the motor 28 and the drive transmission mechanism 30.

The manual eject switch 22 comprises an operating portion 22a exposed at a lateral surface of the tray 11, a sliding portion 22b held inside the tray 11 and slidable in the A-B direction within the tray 11, a rectangular engagement opening 22c formed on the sliding portion 22b, and an aperture 22d that is engaged by an end 31a of a coil spring 31 impelled in the direction of arrow A.

Figure 7:
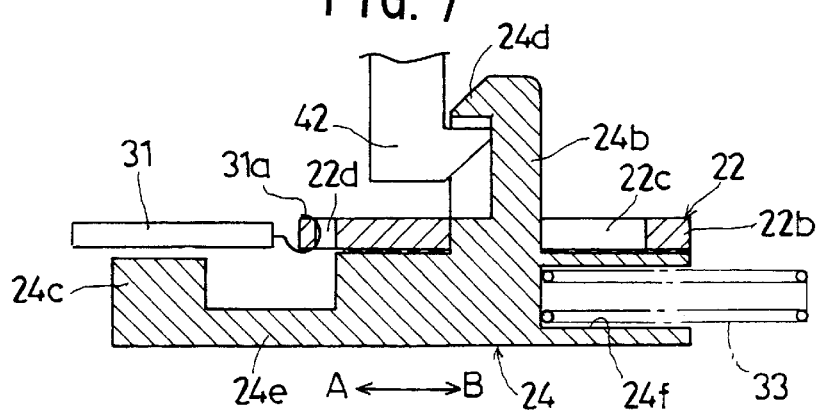
FIG. 7 is a diagram showing a cross-sectional view along a line VI—VI shown in FIG. 5.

The retaining member 24 comprises a sliding base 24a slidable in the A, B direction beneath the sliding portion 22b of the manual eject knob 22, an engaging portion 24b that projects from an upper surface of the sliding base 24a and is inserted loosely into the engagement hole 22c of the manual eject switch 22, a reset projection 24c provided on a tip portion of an arm portion 24e formed so as to extend from the sliding base 24a in the direction of arrow A, and (as shown in FIG. 7) a spring insertion opening 24f for accommodating a coil spring 33 (as shown in FIG. 7) that pushes in the direction of arrow A.

An edge of the engaging portion 24b is formed into a hook portion 24d. This hook portion 24d engages the retaining portion 42 provided on the cover 14 as described above so as to retain the cover 14 in the closed position when the cover 14 has rotated to that closed position.

The drive transmission mechanism 30, which is provided on a base 46 fixedly mounted on the tray 11, comprises an eject motor 28 driven by an eject signal from the personal computer, a worm gear 50 rotatably driven by the motor 28, a first gear 52 having a gear plate 50a that meshes with the worm gear 50, a second gear 54 that has a gear plate 54a that meshes with another gear plate 52b of the first gear 52 (the gear plate 52b having a diameter smaller than the diameter of the gear plate 52a), a moving gear 56 that meshes with another gear plate 54b of the second gear 54 (the gear plate 54b having a diameter smaller than the diameter of the gear plate 54a), a cam gear 58 that meshes with the moving gear 56, a moving plate 60 that rotatably supports the moving gear 56, a reset lever 62 linked to the moving plate 60, and a detection switch 64 for detecting when the cam gear 58 has moved to an original position.

The base 46 comprises a support portion 46a that supports the motor 28, a second support portion 46b that rotatably supports the worm gear 50, an aperture 46c that supports a shaft of the first gear 52 (such aperture not apparent from the view presented in FIG. 4), an aperture 46d that supports the shaft 54c of the second gear 54, an aperture 46e that supports a shaft 58a of the cam gear 58, an aperture 46f that supports a shaft 62a of the reset lever 62, a fourth support portion 46h that supports a leaf spring 66, and a stopper 46i that restricts an initial position of the moving plate.

The cam gear 58 has, on an underside thereof, a first cam 58b that presses the retaining member 24 in the eject direction, that is, in the direction of arrow B. Additionally, the cam gear 58 has, on an upper side thereof, a second cam 58c that contacts a detection portion 64a of the detection switch 64 and an eccentric pin 58d that projects upwardly from the second cam 58c.

The eccentric pin 58d of the cam gear 58 is pressedly contacted by the leaf spring and thus the cam gear 58 rotates in a reset direction during a manual eject operation to be described in detail later.

The moving plate 60 comprises a first aperture 60a that accommodates the shaft 54c of the second gear 54. Additionally, the moving plate 60 also comprises a second aperture that supports a shaft 56a of the moving gear 56, a third aperture 60c that engages a pin 62b that projects from an edge of the reset lever 62, a spring retaining member 60d that is engaged by one end of a coil spring 61, and a contacting portion 60e that contacts the stopper 46i of the base 46 and restricts an initial position.

The moving plate 60 is supported in such a way as to rotate freely about the shaft 54c of the second gear 54, so that, when the reset lever 62 rotates, the pin 62b of the reset lever 62 presses the third aperture 60c, the moving plate 60 moves in the direction in which it is pressed.

Additionally, the moving gear 56, which is supported by the moving plate 60, normally meshes with the gear plate 54b of the second gear 54 and the gear 58e of the cam gear 58, thus transmitting the rotational force of the second gear 54 to the cam gear 58. However, when the manual eject switch 22 has been pushed in the direction of arrow B, the moving gear 56 is separated from the gear 58e of the cam gear 58 by the rotation of the reset lever 62, thus interrupting drive power transmission.

The reset lever 62 comprises a first arm portion 62c having the above-described pin 62b and a second arm portion 62d extending in a direction opposite the direction in which the first arm portion 62c extends. As the manual eject switch 22 is moved manually in the direction of arrow B the retaining member 24 moves to a retention release position and, at the same time, the second arm portion 62d is pressed by the reset projection 24c of the retaining member 24 and rotated in the reset direction, that is, in a counter-clockwise direction.

Figure 6:
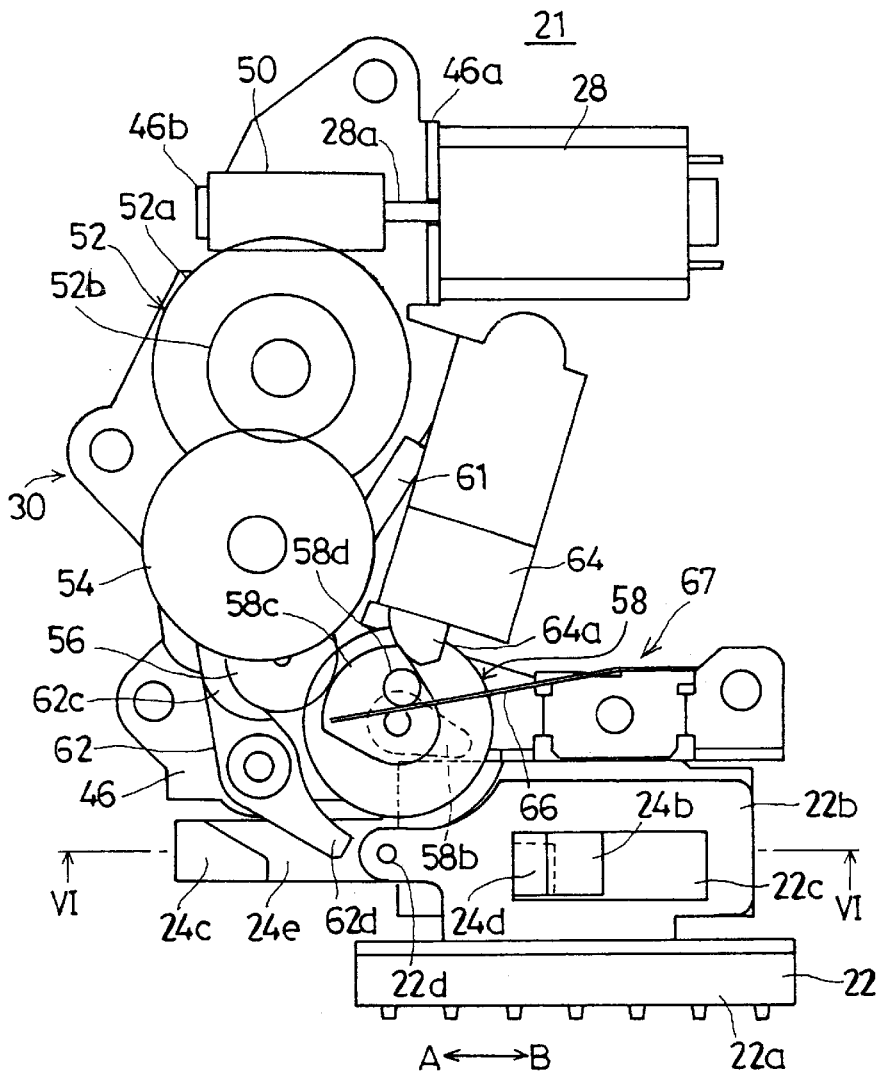
FIG. 6 is a diagram showing a plan view of an initial position of the eject mechanism.

FIG. 6 is a diagram showing a plan view of an initial position of the eject mechanism 21. FIG. 7 is a diagram showing a cross-sectional view along a line VI—VI shown in FIG. 6.

As shown in FIGS. 6 and 7, at the initial position of the eject mechanism 21, the manual eject switch 22 and retaining member 24 are impelled in the direction of arrow A by the spring force of the coil spring 31 and the coil spring 33.

In the above-described initial position, the moving gear 56, which is supported by the moving plate 60, meshes with the gear plate 54b of the second gear 54 and the gear 58e of the cam gear 58, so the drive transmission mechanism 30 is ready to transmit the drive force of the motor 28 to the manual eject switch 22 and the retaining member 24.

Also in the above-described initial position, the retaining member 24 is pressed by the coil spring 33 in the direction of arrow A, so the hook portion 24d of the engaging portion 24b engages the retaining portion 42 provided on the cover 14 as described above so as to retain the cover 14 in the closed position.

It should be noted that, though not visible from the view presented in FIG. 6, the moving plate 60 is rotatingly impelled in the counter-clockwise direction by the spring force of the coil spring 61 so that the contacting portion 60e contacts the stopper 46i, holding the moving plate 60 in the initial position.

A description will now be given of a manual eject operation.

Figure 8:
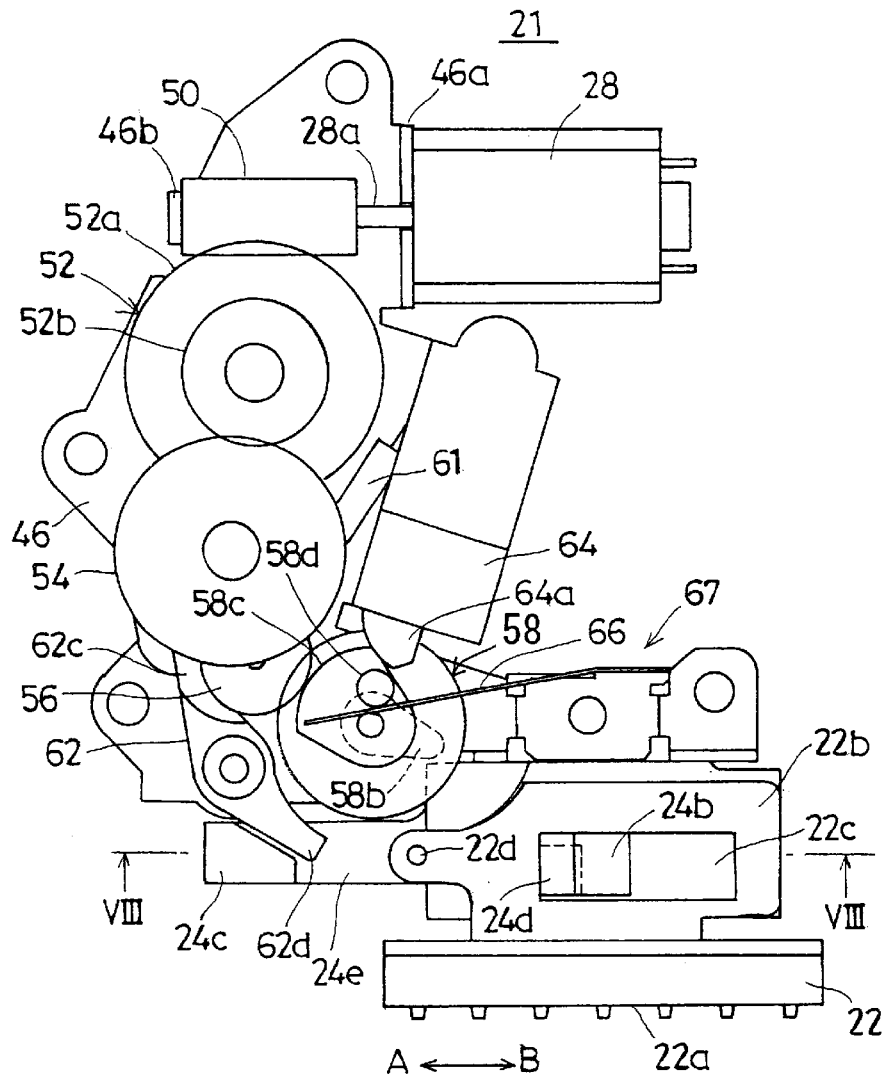
FIG. 8 is a diagram illustrating a manual eject operation.
Figure 9:
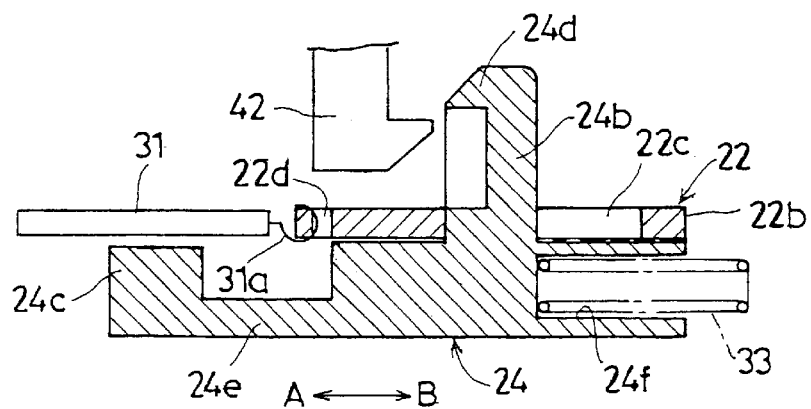
FIG. 9 is a diagram showing a cross-sectional view along a line VIII—VIII shown in FIG. 7.

FIG. 8 is a diagram illustrating a manual eject operation. FIG. 9 is a diagram showing a cross-sectional view along a line VIII—VIII shown in FIG. 8.

As shown in FIGS. 8 and 9, when the manual eject switch 22 is slid in the direction of arrow B an edge portion of the engagement opening 22c pushes the engaging portion 24b of the retaining member 24 in the direction of arrow B. In so doing, the retaining member 24 slides in the direction of arrow B and the hook portion 24d of the engaging portion 24b separates from the retaining portion 42 provided on the cover 14, thereby releasing the cover 14.

As a result, the cover 14 is impelled upward by the force of the torsion spring 36, swinging open so as to expose the disk loading portion 12. In the present embodiment, when the retaining member 24 slides in the direction of arrow B and releases the cover 14, the cover 14 rotates to a predetermined angular position and stops thereat. Thereafter the operator manually swings the cover upward to fully open the cover 14 and fully expose the disk loading portion 12. At this point it is possible to either load a disk or remove a disk already loaded in the disk loading portion 12.

It should be noted that the stroke of the manual eject switch 22 as it slides back and forth in the direction of arrows A, B is such that a forward half of the stroke performs the manual eject operation while a latter half of the stroke performs a reset operation. Additionally, during manual eject, as shown in FIG. 8 the reset projection 24c of the retaining member 24 does not contact the reset lever 62.

Accordingly, since the manual eject operation does not cause the reset projection 24c of the retaining member retaining member 24 to press against the reset lever 62, a reset mechanism 67 to be described later is not activated and hence the reset mechanism 67 does not interfere with the manual eject operation.

A description will now be given of a powered eject operation.

Figure 10:
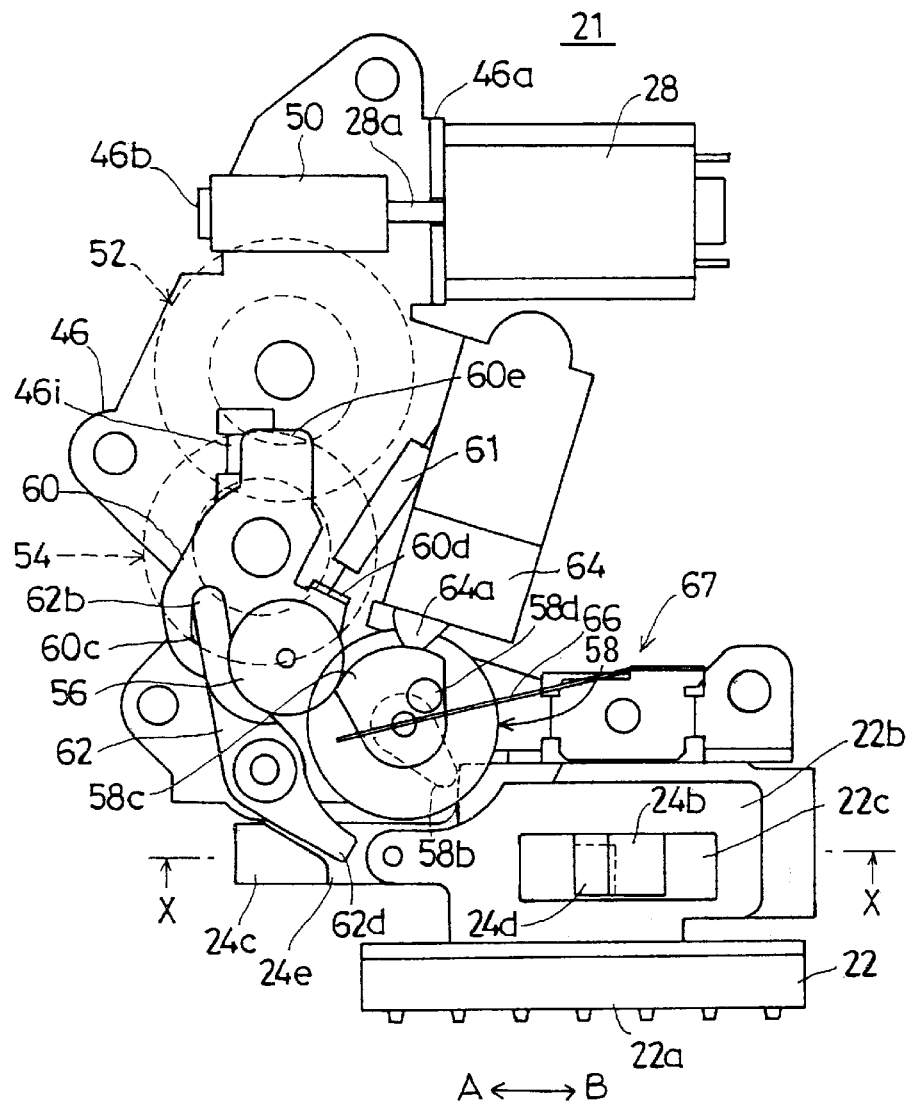
FIG. 10 is a diagram illustrating a powered eject operation.
Figure 11:
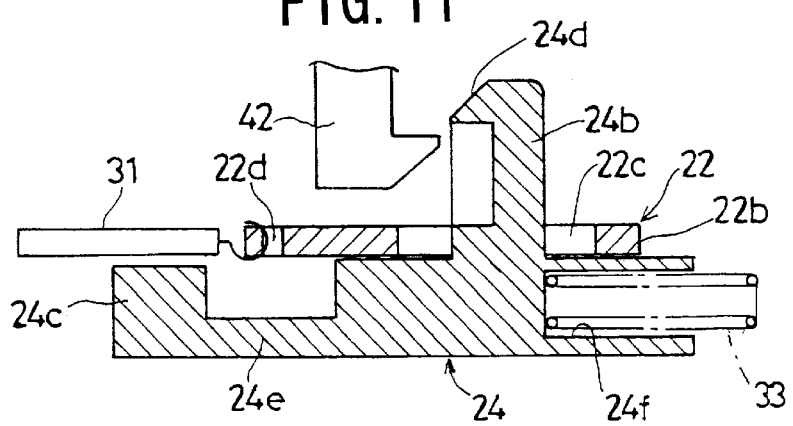
FIG. 11 is a diagram showing a cross-sectional view along a line X—X shown in FIG. 9.

FIG. 10 is a diagram illustrating the powered eject operation. FIG. 11 is a diagram showing a cross-sectional view along a line X—X shown in FIG. 10.

As shown in FIGS. 10 and 11, when a control signal for performing an eject operation is supplied from a personal computer or the like, the motor 28 described above is activated. The rotational drive force of the motor 28 is transmitted to the worm gear 50 coupled to a rotational shaft 28a of the motor 28, the first gear 52 engages the worm gear 50, the second gear 54 engages the first gear 52, the moving gear 56 engages the second gear 54, and the cam gear 58 engages the moving gear 56.

As a result, the cam gear 58 rotates in the counter-clockwise direction and the first cam 58b pushes the sliding base 24a of the retaining member 24 in the direction of arrow B. As a result, the retaining member 24 slides in the eject direction, that is, in the direction of arrow B, and the hook portion 24d of the engaging portion 24b that projects from an upper surface of the sliding base 24a separates from the retaining portion 42 provided on the cover 14, thus releasing the cover.

As a result, the cover 14 is rotated by the force of the torsion spring 36 so as to open and provide access to the disk loading portion 12 of the tray 11. At this time, the engaging portion 24b that projects from an upper surface of the sliding base 24a of the retaining member 24 moves in the direction of arrow B but within the interior of the rectangular engagement opening 22c formed on the sliding portion 22b, so the manual eject switch 22 does not move in the direction of arrow B but remains stationary.

Accordingly, the powered eject operation described above moves only the retaining member 24 in the direction of arrow B without also moving the manual eject switch 22, so there is no danger that the manual eject switch 22 will contact nearby components.

Additionally, at an intermediate stage in the movement of the retaining member 24 to the retention release position, the second cam 58c contacts the detection portion 64a of the detection switch 64, causing the detection switch 64 to turn ON and to output a detection signal to a control circuit not shown in the diagram. As the cam gear 58 rotates further in the counter-clockwise direction and the second cam 58c passes the detection portion 64a of the detection switch 64 to return to its original position, the detection switch 64 turns OFF.

In so doing, the control circuit not shown in the drawing acknowledges that the eject operation is completed and cuts the supply of power to the motor 28. As a result, the motor 28 stops the rotation of the worm gear 50. That is, the cam gear 58 stops after completing one rotation of 360 degrees.

Accordingly, in the CD-ROM 10 having the structure described above, when for example removing or loading a disk during operation of the personal computer the operator can either manually shift the retaining member 24 to perform the eject operation or shift the retaining member 24 by electric power to perform the eject operation, so the cover 14 can be opened without the need for the operator to look away from the display monitor and thus this inconvenient disadvantage of the conventional art can be eliminated.

A description will now be given of a reset operation.

More particularly, in the event that, for example, the power is turned OFF during a powered eject operation while that eject operation is in progress, the retaining member 24 will, of course, be stopped at an intermediate position and thus the cover 14 cannot be retained in a closed position.

In this case, the manual eject switch 22 can be slid in the direction of arrow B to perform the reset operation, that is, returning the retaining member 24 to its initial position.

Figure 12:
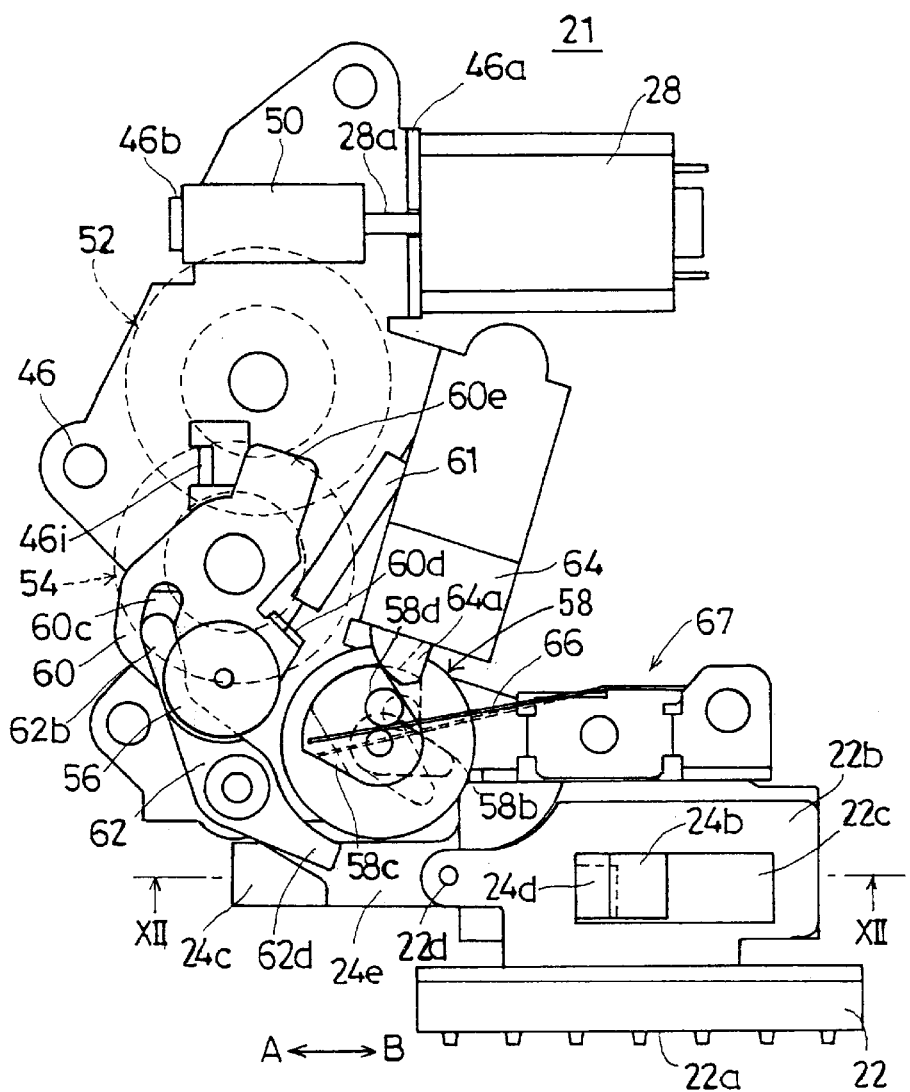
FIG. 12 is a diagram illustrating a reset operation.
Figure 13:
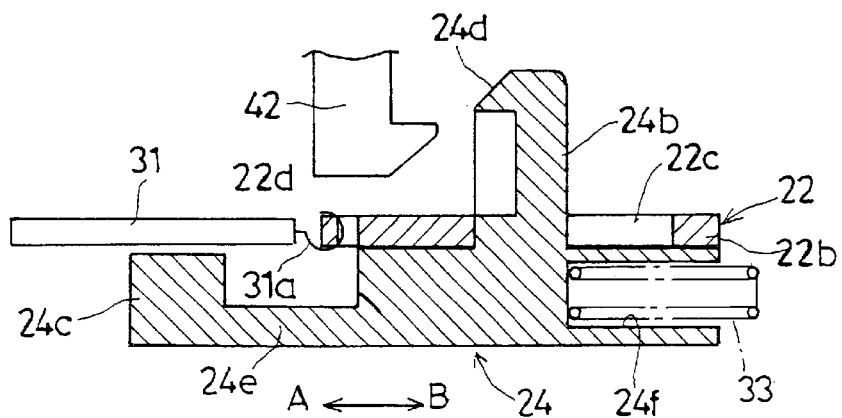
FIG. 13 is a diagram showing a cross-sectional view along a line XII—XII shown in FIG. 11.

FIG. 12 is a diagram illustrating a reset operation. FIG. 13 is a diagram showing a cross-sectional view along a line XII—XII shown in FIG. 12.

As shown in FIGS. 12 and 13, in the event that the powered eject operation is stopped prematurely, that is, at an intermediate stage, the manual eject switch 22 is manually slid in the direction of arrow B, which causes the retaining member 24 to move to the initial retention position and at the same time causes the reset projection 24c of the retaining member 24 to contact the second arm portion 62d of the reset lever 62. As a result, the reset lever 62 rotates in the counter-clockwise direction and the pin 62b that projects from the first arm portion 62c of the reset lever 62 and that engages the moving plate 60 is rotated in a clockwise direction against the force of the coil spring 61.

In so doing, the moving gear 56 supported by the moving plate 60 rotates about its own axis around a periphery of the gear plate 54b of the second gear 54 and separates from the gear 58e of the cam gear 58, putting the cam gear 58 in a state of free rotation. In other words, the drive force transmission mechanism 30 is configured so that the rotational drive force of the motor 28 is transmitted via the worm gear 50 to each of the gears 52, 54, 56 and 58, so the cam gear 58 cannot be rotated even if the retaining member 24 is moved because the above-described path of transmission of the rotary force of the motor 28 has been cut between the moving gear 56 and the cam gear 58 as described above.

However, by separating the moving gear 56 from the cam gear 58 as described above, the cam gear 58 can rotate freely. In this state of free rotation, the eccentric pin 58d that projects upwardly from the second cam 58c of the cam gear 58 is pressed by the leaf spring 66, imparting a rotational force to the cam gear 58 via the eccentric pin 58d. Accordingly, the cam gear 58 is returned to its original position as indicated by the double-dashed line in FIG. 12.

As a result, the first cam 58b of the cam gear 58, which had been pushing the sliding base 24a of the retaining member 24 in the eject direction, that is, in the direction of arrow B, returns to its original position, and as a result the retaining member 24 also returns to its original position as shown in FIGS. 6 and 7. At this point it is possible to retain the cover 14 in the closed position.

It should be noted that, in the embodiment described above, the reset projection 24c provided on the above-described retaining member 24, the reset lever 62, the moving plate 60, the moving gear 56, the cam gear 58 and the leaf spring 66 together form the reset mechanism 67 noted earlier.

A description will now be given of a connection between the CD-ROM device 10 and a lap-top personal computer. A description will also be given of control of the powered eject operation described above.

Figure 14:
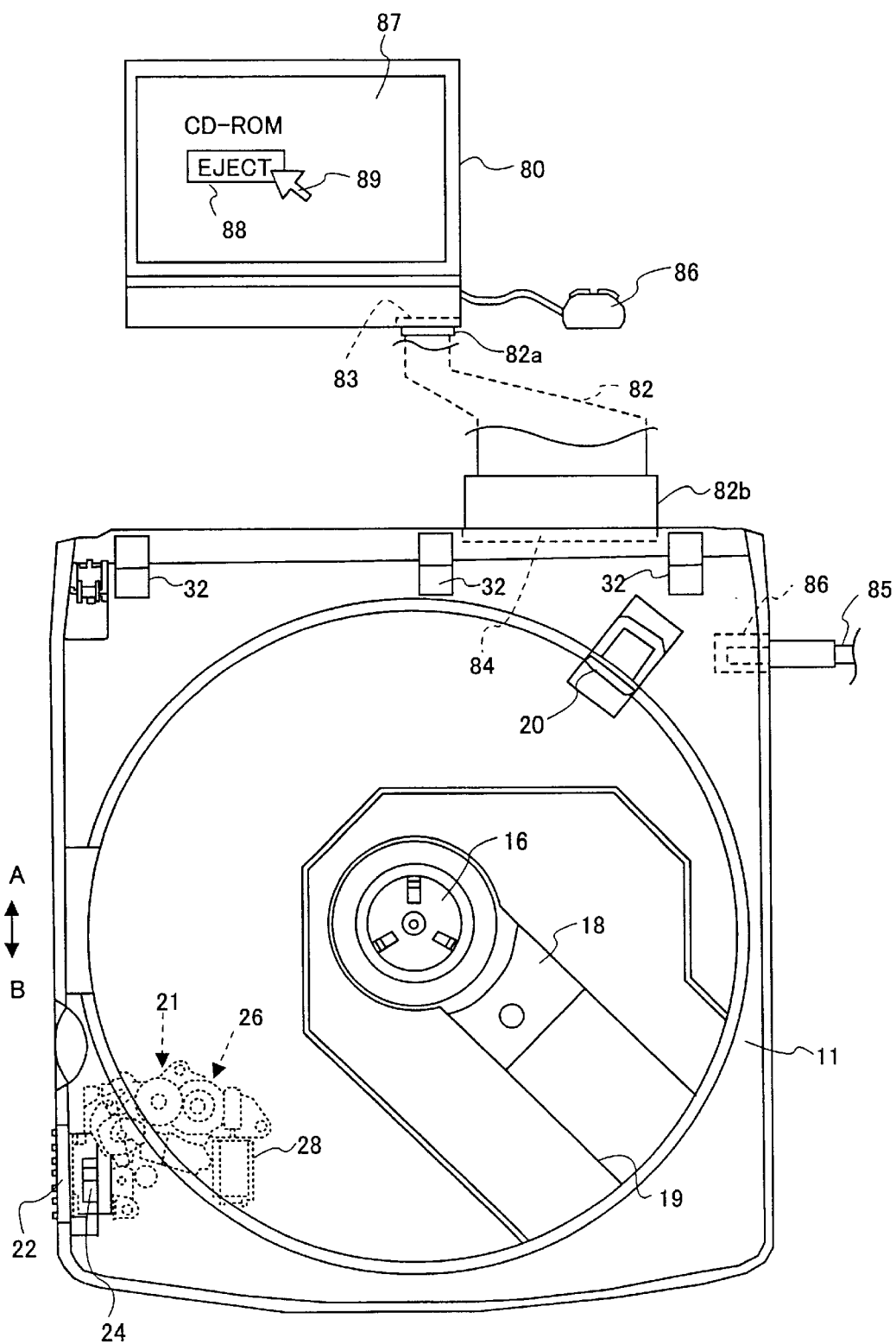
FIG. 14 is a schematic diagram showing a connection of a CD-ROM device according to one embodiment of the present invention.
Figure 15:
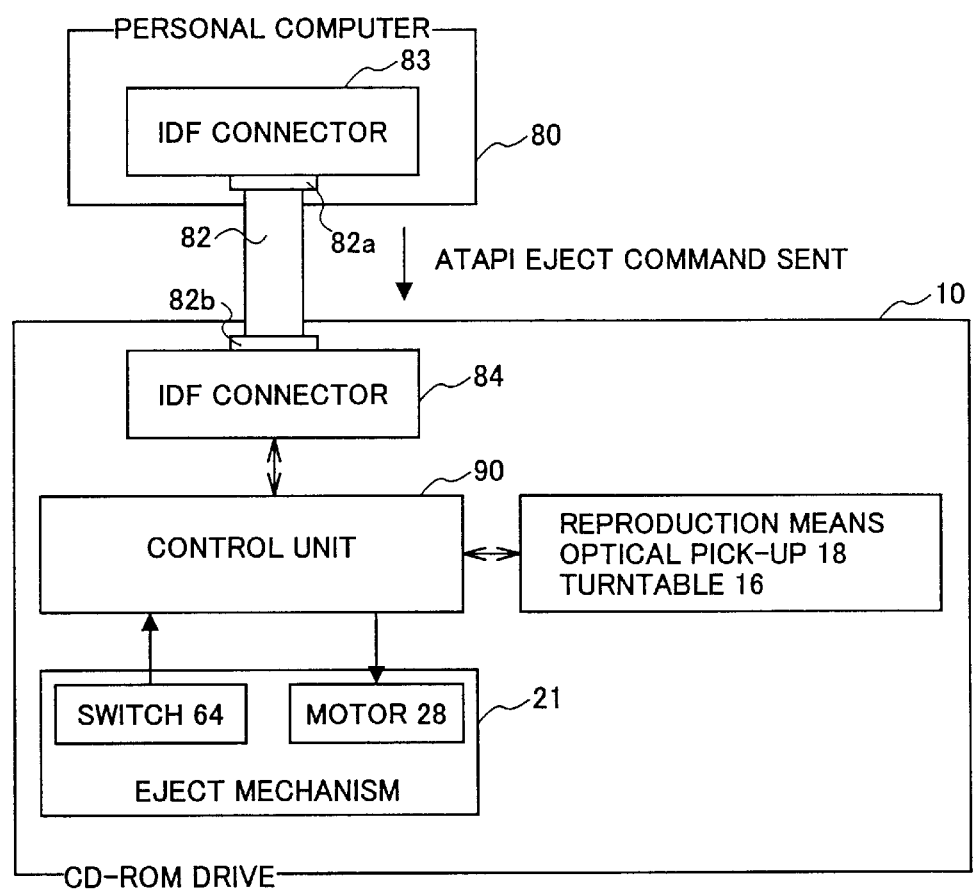
FIG. 15 is a diagram for explaining a method of connecting the CD-ROM device and a lap-top type personal computer.

FIG. 14 is a schematic diagram showing a connection of a CD-ROM device according to one embodiment of the present invention. FIG. 15 is a diagram for explaining the connection of the CD-ROM device and a lap-top personal computer.

As shown in FIG. 14, the CD-ROM device 10 is a portable type connected to a lap-top personal computer 80 via a connection cable 82. The connection cable 82 is composed of a plurality of ribbon-shaped flat cables and has 40-pin IDE (Intelligent Drive Electronics) connector connection terminals 82a, 82b at both ends. The lap-top personal computer 80 is provided with an IDE connector, to which the connection terminal 82a of the connection cable 82 is connected. Similarly, the CD-ROM device 10 is provided with an IDE connector 84, to which the connection terminal 82b of the connection cable 82 is connected.

The connection cable 82 transmits to the CD-ROM device 10 disk playback and stop command control signals determined by ATAPI (AT attachment packet interface) standard. Accordingly, at the same time that various control commands are transmitted from the lap-top personal computer 80 to the CD-ROM device 10 via the connection cable 82, data read by the optical pick-up 18 is transmitted to the lap-top personal computer 80 via the connection cable 82.

The CD-ROM device 10 is further equipped with a connector 86 provided on a side surface of the device. The connector 86 accommodates a plug to which is connected a power cable 85 from an adapter that converts 100 V AC into 3–6 V DC electric power. The power supplied via the power cable 85 powers the turntable 16, the optical pick-up 18 and the eject motor 28. If the CD-ROM device 10 is connected to the lap-top personal computer 80 via a USB (Universal Serial Bus) cable, then power is supplied via the USB cable without the use of the power cable 85.

In order to make the CD-ROM device 10 perform an eject operation, the operator may, for example, operate a mouse 86 connected to the lap-top personal computer 80 to maneuver a pointer 89 to an eject icon 88 displayed on the LCD 87 of the lap-top personal computer 80 and click the mouse 86. In so doing, an ATAPI-standard eject command is transmitted from the lap-top personal computer 80 to the CD-ROM device 10 via the connection cable 82.

As shown in FIG. 15, the CD-ROM device 10 includes a control unit 90 that controls the turntable 16 and the optical pick-up 18 which together form the means for reproducing information recorded on the disk. This control unit 90, when supplied with an eject command via the IDE connector 83, the connection cable 82 and the IDE connector 84, rotatably drives the eject mechanism 21 eject motor 28 to release the cover 14 and also stops the rotation of the eject motor 28 in response to an ON/OFF signal from the detection switch 64 that detects opening of the cover 14.

Figure 16:
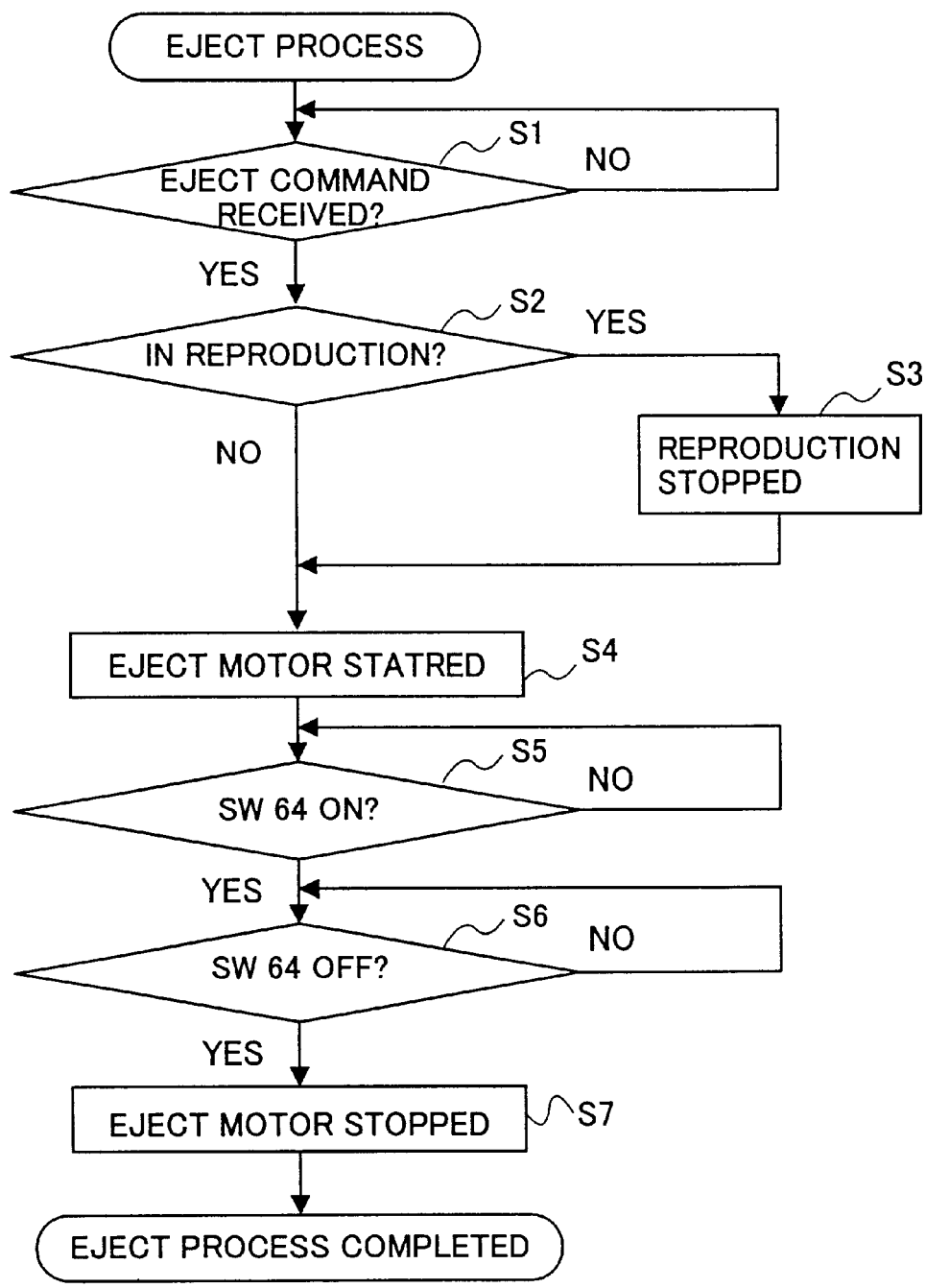
FIG. 16 is a flow chart for explaining an eject process performed by a control unit.

FIG. 16 is a flow chart for explaining an eject process performed by the control unit 90.

As shown in FIG. 16, the control unit 90, in a step S1, receives an eject command from the lap-top personal computer 80. Once an eject command from the lap-top personal computer 80 has been input, the control unit 90 proceeds to a step S2 and determines whether or not the optical pick-up is engaged in reproducing information recorded on the disk. In a step S3, the control unit 90 halts reproduction if it determines that the optical pick-up 18 is engaged in reproducing information in step S2.

Once reproduction of information has stopped in step S3, the control unit 90 then proceeds to a step S4, in which the eject mechanism 21 eject motor 28 is activated. Next, in a step S5, the control unit 90 ascertains whether the detection switch 64 that detects opening of the cover 14 is turned ON (see FIG. 10), and in a step S6 determines whether the detection switch 64 is turned OFF (see FIG. 6). When in step S6 the detection switch 64 turns OFF the control unit 90 proceeds to step S7, stops the eject motor 28 and halts opening of the cover 14.

A description will now be given of a cover opening mechanism 34 according to the present invention.

Figure 17:
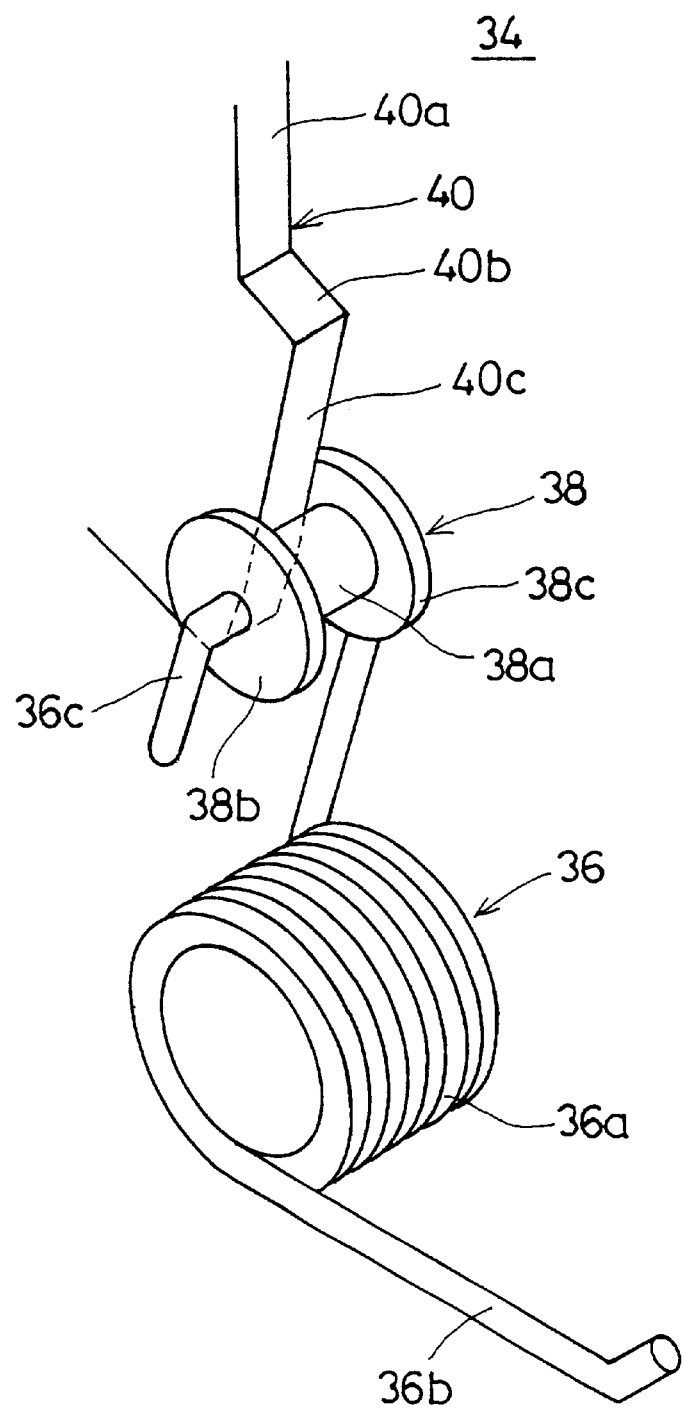
FIG. 17 is a diagram showing an enlarged perspective view of a cover opening mechanism.
Figure 18:
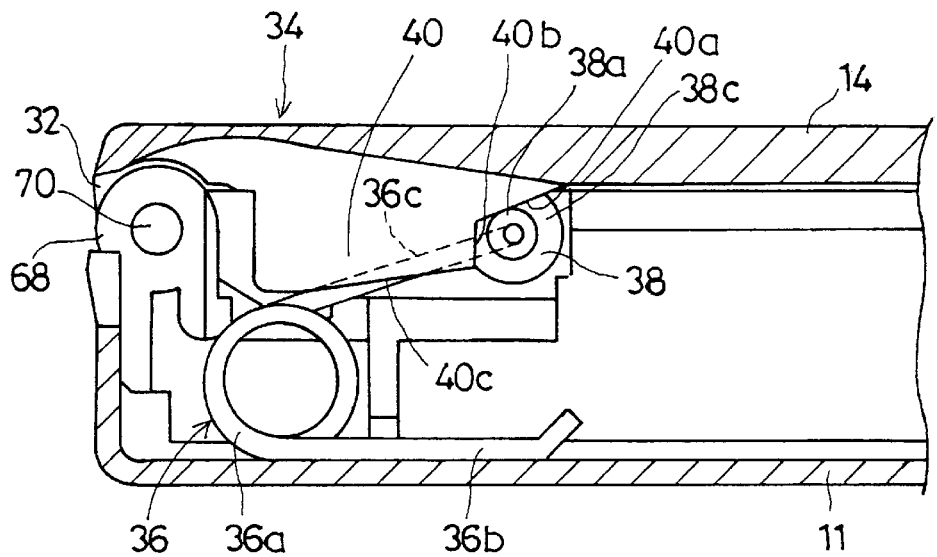
FIG. 18 is a diagram showing an enlarged side cross-sectional view of the cover opening mechanism in a closed position.

FIG. 17 is a diagram showing an enlarged perspective view of the cover opening mechanism. FIG. 18 is a diagram showing an enlarged side cross-sectional view of the cover opening mechanism in a closed position.

As shown in FIGS. 17 and 18, the cover opening mechanism 34 comprises a torsion spring 36 that impels the cover 14 toward a direction in which the cover 14 opens, a roller 38 supported by the spring 36, and a cam 40 that contacts the roller 38. A shaft 70 is passed between the bearing portions 32 of the cover 14 and the bearing portions 68 of the tray 11, with the cover swinging open and closed about the shaft 70.

A more detailed description will now be given of the torsion spring 36, the roller 38 and the cam 40 that together form the cover opening mechanism 34.

The torsion spring 36 comprises a coil portion 36a, a retaining member 36b extending tangentially from a side of the coil portion 36a and retained by the tray 11, and a roller support portion 36c extending tangentially from an opposed side of the coil portion 36a with a tip part thereof formed into substantially a U shape. The torsion spring 36 roller support portion 36c supports the roller 38 so that the roller 38 rotates freely.

The roller 38 comprises a substantially cylindrical rotary portion 38a that contacts the cam 40 as well as flange portions 38b, 38c provided at both lateral ends of the rotary portion 38a and having a diameter larger than a diameter of the rotary portion 38a. Additionally, the roller 38 has a width between the flange portions 38b, 38c slightly larger than a width of the cam 40 so as to accommodate the cam 40 between the flange portions 38b, 38c. The flange portions 38b, 38c contact lateral surfaces of the cam 40 to keep the rotary portion 38a from separating from the cam 40.

The cam 40 comprises a first cam surface 40a that contacts the roller 38 when the cover is retained in the closed position, a step portion 40b that retains the cover 14 at a half-open position, and a second cam surface 40c that contacts the roller 38 and pushes the cover 14 to a fully open position.

A description will now be given of an operation of the above-described cover opening mechanism 34.

Figure 19:
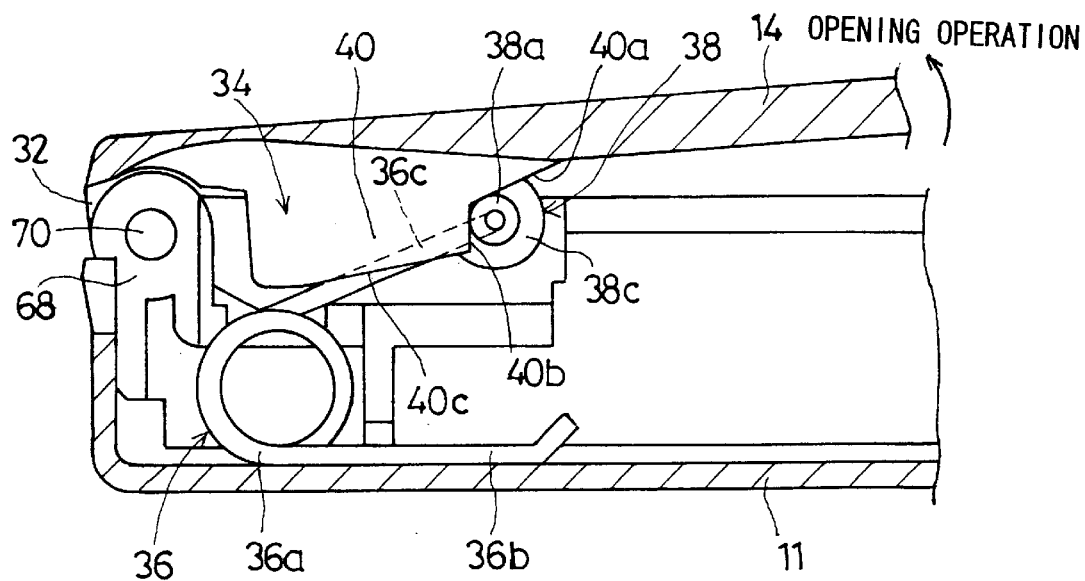
FIG. 19 is a diagram showing a side view of a first stage of an opening operation of the cover.
Figure 20:
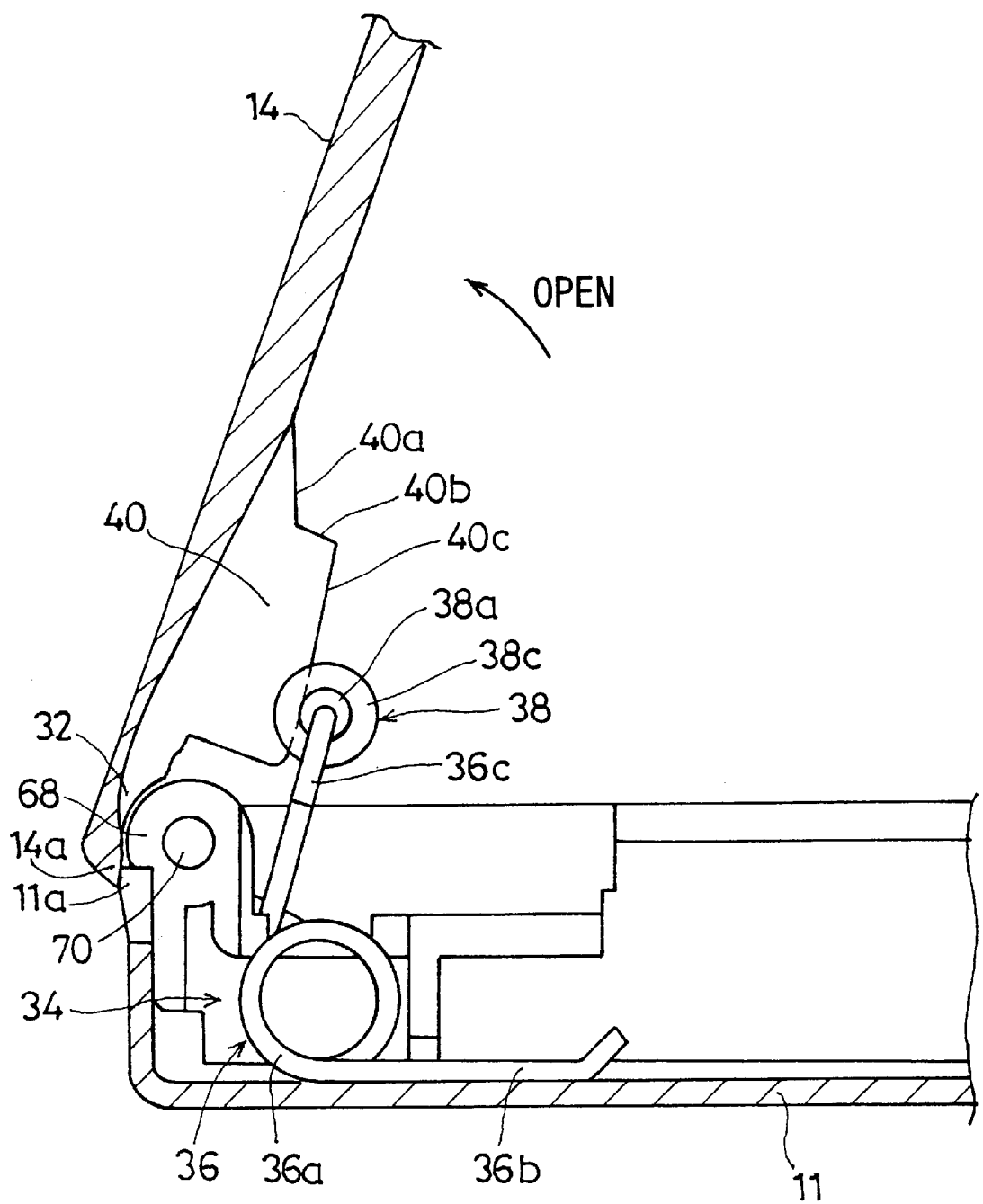
FIG. 20 is a diagram showing a side view of a second stage of an opening operation of the cover.

FIG. 19 is a diagram showing a side view of a first stage of an opening operation of the cover 14. FIG. 20 is a diagram showing a side view of a second stage of the opening operation of the cover 14.

As described above, when the retaining member 24 is moved either manually or automatically in the direction that releases the cover 14, that is, in the direction of arrow B, the hook portion 24d of the engaging portion 24b of the retaining member 24 separates from the retaining portion 42 provided on the cover 14, thereby releasing the cover 14. As a result, the cover 14 is swung open by the force of the torsion spring 36.

When the cover 14 is retained in the closed position, the roller 38 provided on the torsion spring 36 contacts the first cam surface 40a of the cam 40 as shown in FIG. 18, so that the force of the torsion spring 36 acts upon the first cam surface 40a of the cam 40 via the roller 38.

At the same time as the retention of the engaging portion 24b of the retaining member retaining member 24 is released the cover 14 begins to swing upward and open. As the cover swings upward and open the roller 38 rolls over the first cam surface 40a of the cam 40 and contacts the step portion 40b as shown in FIG. 19.

At this stage, the contact of the step portion 40b with the roller 38 limits the extent to which the cover swings open. That is, the rotational radius of the torsion spring 36 that supports the roller 38 and the rotational radius of the step portion 40b of the cam 40 intersect, so the rotation of the step portion 40b of the cam 40 in the direction in which the cover 14 opens is interrupted by the roller 38. Accordingly, the cover 14 stops at the half-open position at which the roller 38 contacts the step portion 40b of the cam 40 even if an eject operation is performed.

By halting the opening of the cover 14 at the half-open position described above, a state in which the cover is fully open while a disk loaded on the disk loading portion 12 inside the tray 11 is still rotating out of inertia is prevented from happening.

To continue, an operator then manually swings the cover open to a fully open position, that is, to the position shown in FIG. 16. When the cover swings to a predetermined angle of inclination, at which position the cover 14 is fully open, a projecting portion 14a provided on a rear of the cover 14 contacts a contacting portion 11a provided on a rear of the tray 11 to maintain the cover 14 in the fully open position and at the same time prevent the cover 14 from swinging open further. It should be noted that the eject operation causes the motor that rotates the turntable 16 to stop rotating, though in actuality the motor and thus the turntable 16 continue to rotate through inertia for another 1–3 seconds before coming to a full stop. Accordingly, the cover 14 is fully opened only after the turntable 16 has stopped rotating.

Next, a description will be given of a braking operation and a brake release operation of a disk braking mechanism 17 having a brake member 20.

Figure 21A:
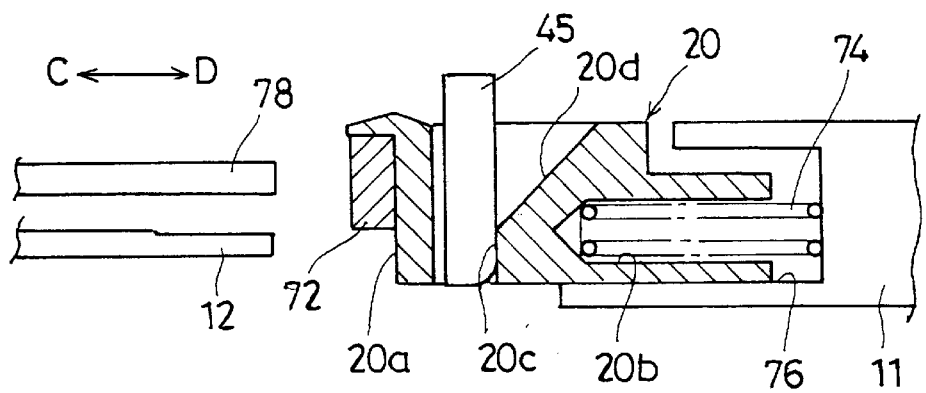
FIGS. 21A, 21B and 21C are diagrams showing cross-sectional views of the cover at closed, half-open, and open positions, respectively.
Figure 21B:
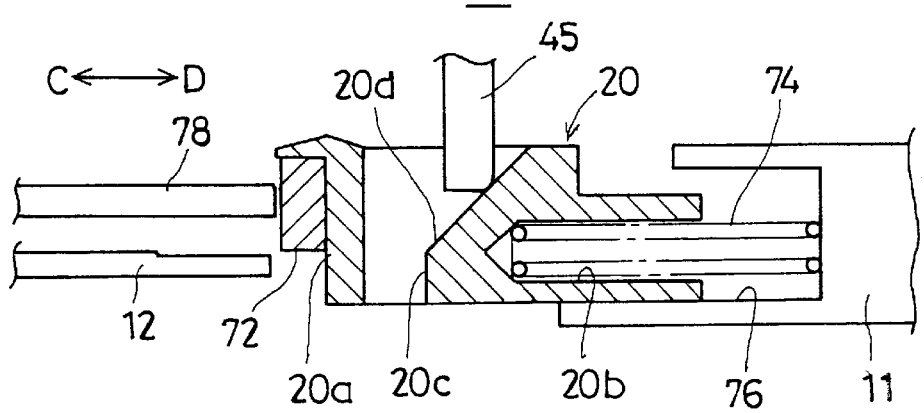
Figure 21C:
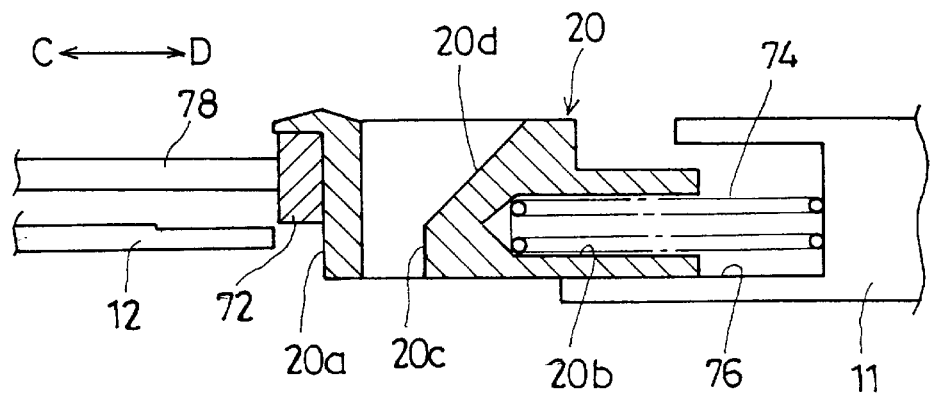

FIGS. 21A, 21B and 21C are diagrams showing cross-sectional views of the cover 14 at closed, half-open, and open positions, respectively.

As shown in FIG. 21A, the disk braking mechanism 17 comprises the brake member 20 provided at a periphery of the disk loading portion 12, the brake release pin 45 provided on the cover 14 described above, a frictional member 72 fixedly mounted on a tip portion of the brake member 20 and a coil spring 74 that impels the brake member 20 in a braking direction, that is, in a direction indicated by arrow C in the diagram. It should be noted that the frictional member 72 is formed of a material having a high coefficient of friction, such as silicon rubber or the like.

The brake member 20 is slidably inserted in a guide aperture 76 in the tray 11, and has a mounting portion 20a at an end opposite the disk loading portion 12 for mounting the frictional member 72 and an aperture 20b at the other end into which the coil spring 74 is inserted. Additionally, the brake member 20 has an engagement aperture 20c that penetrates the brake member in a vertical direction and a slanted portion 20d that communicates with the engagement aperture 20c.

When the cover 14 is in the closed position the brake release pin 45 engages, that is, penetrates, the engagement aperture 20c provided on the brake member 20. At this time, the brake release pin 45 moves the braking member 20 in a brake release direction, that is, in a direction indicated by arrow D in FIG. 21A, thus separating the frictional member 72 from a periphery of a disk 78, again as shown in FIG. 21A. That is, the brake member 20 is released from the disk 78, so the disk 78 is allowed to rotate freely.

When the cover assumes the half-open position described above as shown in FIG. 21B by the ejection action previously described, the brake release pin 45 rises and the brake member 20 moves in the direction of arrow C. A tip portion of the brake release pin 45 contacts the slanted portion 20d of the brake member 20, so the frictional member 72 approaches the periphery of the disk 78 without contacting the disk 78 and thus without imparting a braking force to the disk 78.

At this time, a counterelectromotive force is applied to the motor that rotatably drives the turntable 16, thus slowing the rotation of the motor while the cover is in the half-open position.

When the cover 14 swings into the fully open position as shown in FIG. 21C, the brake release pin 45 separates from the slanted portion 20d of the brake member 20, causing the brake member 20 to move in the direction of arrow C. The frictional member 72 fixedly mounted on the tip portion of the brake member 20 then contacts the periphery of the disk 78, imparting a braking force to the disk 78. The disk 78 is thus forcibly stopped from rotating in the event that the disk 78 is still rotating when the cover 14 is fully opened.

Additionally, after the disk 78 has been loaded and the cover 14 closed, in an operation that is the reverse of the cover opening operation described above the brake release pin 45 presses against the slanted portion 20d of the brake member 20 and moves the brake member 20 in the brake release direction, that is, in the direction of arrow D. When the brake release pin 45 engages the engagement aperture 20c of the brake member 20, the brake member 20 retains the frictional member 72 at a brake release position separated from the periphery of the disk 78.

A description will now be given of a variation of the disk braking mechanism 17.

Figure 22A:
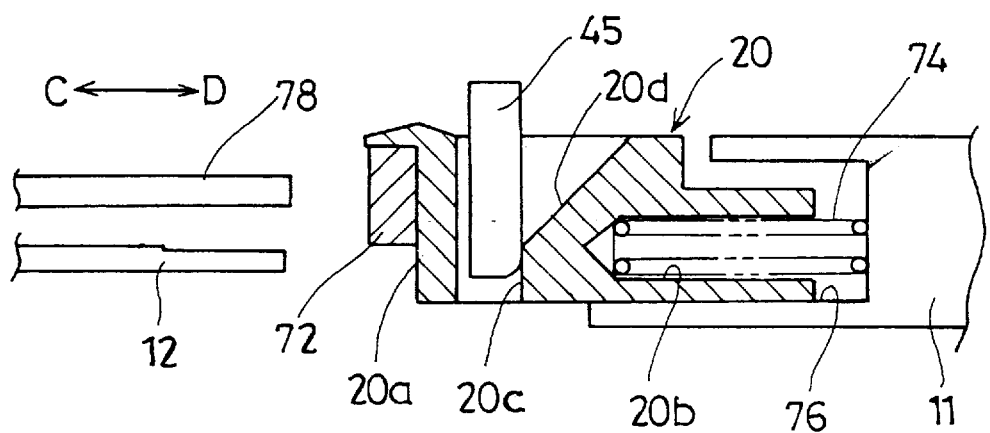
FIGS. 22A and 22B are diagrams illustrating an operation of a disk braking mechanism according to a variation of the present invention, showing cross-sectional views of the cover in a closed position and a half-open position, respectively.
Figure 22B:
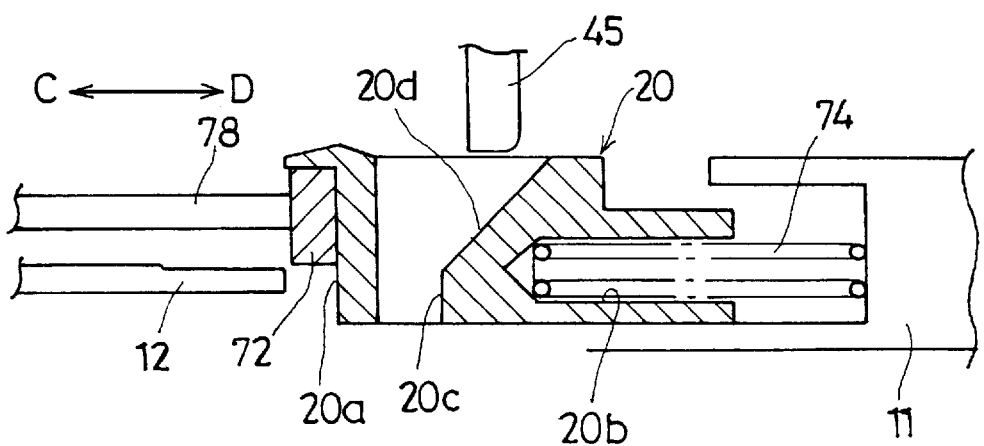

FIGS. 22A and 22B are diagrams illustrating an operation of a disk braking mechanism 17 according to a variation of the present invention, showing cross-sectional views of the cover 14 in a closed position and a half-open position, respectively.

As shown in FIG. 22A, when the cover is in a closed position, the brake release pin 45 engages the engagement aperture 20c provided on the brake member 20, the brake member 20 is impelled in the brake release direction, that is, in the direction of arrow D, and the frictional member 72 is separated from the periphery of the disk 78.

As shown in FIG. 22B, when the cover 14 assumes the half-open position described above by the eject operation previously described, the brake release pin 45 rises and separates from the slanted portion 20d of the brake member 20, causing the brake member 20 to move in the direction of arrow C. The frictional member 72 fixedly mounted on the tip portion of the brake member 20 then contacts the periphery of the disk 78, imparting a braking force to the disk 78. As a result, the pressure of the frictional member 72 on the disk 78 when the cover 14 is in the half-open position described above brakes the disk 78 and causes the disk 78 to stop rotating.

The above-described variation is configured so that the frictional member 72 contacts the periphery of the disk 78 when the cover 14 is in the half-open position, so the disk 78 is stopped when the cover 14 is fully open.

It should be noted that although the embodiment and variation noted above are described in terms of a configuration using a CD-ROM device 10, in actuality the disk unit according to the present invention is not limited to such a configuration but may be adapted for use in, for example, a CD-R device, a CD-RW device, a DVD device or a magneto-optical disk unit device as well.

The above description is provided in order to enable any person skilled in the art to make and use the invention and sets forth the best mode contemplated by the inventors of carrying out the invention.

The present invention is not limited to the specifically disclosed embodiments, and variations and modifications may be made without departing from the scope and spirit of the present invention.

The present application is based on Japanese Priority Application No. 11-310192, filed on Oct. 29, 1999, the entire contents of which are hereby incorporated by reference.

What is claimed is:

1. A disk unit comprising:
   a loading portion that accommodates a recording medium;
   a main body unit that contains the loading portion;
   a cover rotatably attached to the main body unit and capable of moving between a closed position that covers the loading portion and a plurality of open positions that expose the loading portion;
   a retaining member, provided on the main body unit, that retains the cover in the closed position;
   moving means, responsive to a manual operation, for moving the retaining member to a release position where the cover is released from retention in the closed position;
   drive means activated in response to an eject signal; and
   a drive transmission mechanism that transmits a drive force from the drive means to the retaining member so as to move the retaining member to the release position,
   wherein said drive transmission mechanism comprises:
      transmission gears;
      a transmission member that moves the retaining member to the release position; and
      a reset mechanism that resets the transmission member to an original position when said moving means is operated manually,
   and wherein said reset mechanism comprises:
      a reset projection, provided on the retaining member, that moves toward the release position when said moving means is operated manually;
      a reset lever that separates the transmission gears when the reset projection moves toward the release position; and
      an impelling member that returns the transmission member to the original position when the reset lever separates the transmission gears from each other.

2. A disk unit comprising:
   a loading portion to accommodate a recording medium which is loaded;
   a main body unit which contains the loading portion;
   a cover rotatably attached to the main body unit and capable of moving between a closed position which covers the loading portion and an open position which exposes the loading position;
   a retaining member, provided on the main body unit, to retain the cover in the closed position; and
   a dual release mechanism to move the retaining member to a release position where the cover is released from the closed position,
   said dual release mechanism comprising:
      manual moving means for manually moving the retaining member to the release position; and
      an automatic moving means including an electrical drive means activated in response to an electrical eject signal, and a drive transmission mechanism,
      said drive transmission mechanism forming a driving force transmitting path between the electrical drive means and the retaining member when the electrical drive means is activated, so as to automatically move the retaining member to the release position by a driving force of the electrical drive means,
      said drive transmission mechanism forming no driving force transmitting path between the electrical drive means and the retaining member when the retaining member is moved to the release position by the manual moving means, so as not to move the electrical drive means even when the retaining member moves.

3. The disk unit as claimed in claim 2, wherein said manual moving means comprises:
   an operating portion to be manually operated; and
   a driving portion to drive the retaining member,
   said driving portion moving the retaining member to the release position when the operating portion is manually operated,
   said driving portion disengaging from the retaining member when said automatic moving means moves the retaining member to the release position, so that the operating portion does not move even when the retaining member moves.

4. The disk unit as claimed in claim 2, wherein the retaining member comprises an engaging portion to engage within a slot in the manual moving means so as to move freely within the slot when moving towards the release position in response to the electrical eject signal.

5. The disk unit as claimed in claim 2, wherein the drive transmission mechanism comprises:
   a transmission member to move the retaining member to the release position; and
   a reset mechanism to reset the transmission member to an original position when the manual moving means moves the retaining member.

6. The disk unit as claimed in claim 5, wherein the drive transmission mechanism further comprises transmission gears, and wherein the reset mechanism comprises:
   a reset projection, provided on the retaining member, to move towards the release position when the manual moving means manually moves the retaining member towards the release position;
   a reset layer to separate the transmission gears when the reset projection moves towards the release position; and
   an impelling member to return the transmission member to the original position when the reset lever separates the transmission gears from each other.

7. The disk unit as claimed in claim 2, further comprising:
   a drive unit to control the electrical drive means in response to an eject signal adapted to be received from a computer which is externally coupled to the disk unit.

8. The disk unit as claimed in claim 7, wherein the computer is externally coupled to the disk unit via a cable, and the cable transmits control signals which are used by the computer when reading information from the recording medium.

9. A disk unit comprising:

a loading portion to accommodate a recording medium which is loaded;

a main body unit which contains the loading portion;

a cover rotatably attached to the main body unit and capable of moving between a closed position which covers the loading portion and an open position which exposes the loading portion;

a retaining member, provided on the main body unit, to retain the cover in the closed position, and a dual release mechanism to move the retaining member to a release position where the cover is released from the closed position, said dual release mechanism comprising:

manual moving means for manually moving the retaining member to the release position; and an automatic moving means including an electrical drive means activated in response to an electrical eject signal, and a drive transmission mechanism, said manual moving means comprising:

an operating portion to be manually operated; and a driving portion to drive the retaining member, said driving portion moving the retaining member to the release position when the operating portion is manually operated, said driving portion disengaging from the retaining member when said automatic moving means moves the retaining member to the release position, so that the operating portion does not move even when the retaining member moves.

10. The disk unit as claimed in claim 9, wherein the said drive transmission mechanism forms a driving force transmitting path between the electrical drive means and the retaining member when the electrical drive means is activated to automatically move the retaining member to the release position by a driving force of the electrical drive means, and forms no driving force transmitting path between the electrical drive means and the retaining member when the retaining member is moved to the release position by the manual moving means, so as not to move the electrical drive means even when the retaining member moves.

11. The disk unit as claimed in claim 9, wherein the retaining member comprises an engaging portion to engage within a slot in the manual moving means so as to move freely within the slot when moving towards the release position in response to the electrical eject signal.

12. The disk unit as claimed in claim 9, wherein the drive transmission mechanism comprises:

a transmission member to move the retaining member to the release position; and a reset mechanism to reset the transmission member to an original position when the manual moving means moves the retaining member.

13. The disk unit as claimed in claim 12, wherein the drive transmission mechanism further comprises transmission gears, and wherein the reset mechanism comprises:

a reset projection, provided on the retaining member, to move towards the release position when the manual moving means manually moves the retaining member towards the release position;

a reset lever to separate the transmission gears when the reset projection moves towards the release position; and an impelling member to return the transmission member to the original position when the reset lever separates the transmission gears from each other.

14. The disk unit as claimed in claim 9, further comprising:

a drive unit to control the electrical drive means in response to an eject signal adapted to be received from a computer which is externally coupled to the disk unit.

15. The disk unit as claimed in claim 14, wherein the computer is externally coupled with the disk unit via a cable, and the cable transmits control signals which are used by the computer when reading information from the recording medium.

* * * * *